(12) United States Patent
Hemphill et al.

(10) Patent No.: US 10,336,056 B2
(45) Date of Patent: Jul. 2, 2019

(54) HYBRID ADDITIVE MANUFACTURING METHOD

(71) Applicant: Colorado School of Mines, Golden, CO (US)

(72) Inventors: Ryan L. Hemphill, Los Alamos, NM (US); Kevyn C. Young, Longmont, CO (US); Maxwell T. Harris, Fairplay, CO (US); Adam R. Short, Lakewood, CO (US); Douglas L. Van Bossuyt, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 15/253,541

(22) Filed: Aug. 31, 2016

(65) Prior Publication Data

US 2017/0057164 A1 Mar. 2, 2017

Related U.S. Application Data

(60) Provisional application No. 62/265,858, filed on Dec. 10, 2015, provisional application No. 62/212,401, filed on Aug. 31, 2015.

(51) Int. Cl.
*B29C 41/22* (2006.01)
*B33Y 80/00* (2015.01)
(Continued)

(52) U.S. Cl.
CPC ............ *B33Y 80/00* (2014.12); *B29C 64/106* (2017.08); *B29C 64/118* (2017.08);
(Continued)

(58) Field of Classification Search
CPC ..... B29C 41/22; B29C 64/106; B29C 64/118; B29C 64/124; B29C 64/129; B29C 64/135; B29C 64/165; B33Y 10/00
(Continued)

(56) References Cited

U.S. PATENT DOCUMENTS

| 4,078,229 A | 3/1978 | Swanson et al. |
| 4,575,330 A | 3/1986 | Hull |

(Continued)

FOREIGN PATENT DOCUMENTS

| CN | 104097326 | 10/2014 |
| CN | 104149339 | 11/2014 |

(Continued)

OTHER PUBLICATIONS

"MakerJuice—European Reseller" www.buildyourownsla.com (dated Mar. 10, 2014).*

*Primary Examiner* — Leo B Tentoni
(74) *Attorney, Agent, or Firm* — Sheridan Ross P.C.

(57) ABSTRACT

A hybrid additive manufacturing method that allows for precise deposition of various photo curable resins without the use of a vat has been developed. This method utilizes thermoplastics for an exterior shell and structural support. This method of resin or epoxy deposition allows for stronger parts to be printed more rapidly through hybridization of two additive manufacturing methods. This hybrid nature greatly expands material compatibilities from strictly thermoplastics to thermoplastics and any photo curable resins. Furthermore, reinforcing materials or dopants can be incorporated into the part using the method and apparatus.

20 Claims, 18 Drawing Sheets
(15 of 18 Drawing Sheet(s) Filed in Color)

(51) Int. Cl.
*B33Y 10/00* (2015.01)
*B33Y 30/00* (2015.01)
*B29C 64/118* (2017.01)
*B29C 64/106* (2017.01)
*B29C 64/135* (2017.01)
*B29C 64/20* (2017.01)

(52) U.S. Cl.
CPC ............ *B29C 64/135* (2017.08); *B29C 64/20* (2017.08); *B33Y 10/00* (2014.12); *B33Y 30/00* (2014.12)

(58) Field of Classification Search
USPC ........ 264/112, 236, 255, 308, 401, 494, 496
See application file for complete search history.

(56) References Cited

U.S. PATENT DOCUMENTS

| | | |
|---|---|---|
| 5,121,329 A | 6/1992 | Crump |
| 5,247,180 A | 9/1993 | Mitcham et al. |
| 5,597,520 A | 1/1997 | Smalley et al. |
| 5,637,175 A | 6/1997 | Feygin et al. |
| 6,103,176 A | 8/2000 | Nguyen et al. |
| 7,959,847 B2 | 6/2011 | Wicker et al. |
| 8,252,223 B2 | 8/2012 | Medina et al. |
| 8,827,684 B1 | 9/2014 | Schumacher et al. |
| 2014/0121813 A1* | 5/2014 | Schmehl ............... B29C 64/106 700/119 |
| 2014/0268604 A1 | 9/2014 | Wicker et al. |
| 2014/0361460 A1 | 12/2014 | Mark |
| 2015/0145168 A1* | 5/2015 | Rodgers ............... B29C 64/106 264/308 |
| 2015/0239178 A1 | 8/2015 | Armstrong |

FOREIGN PATENT DOCUMENTS

| | | |
|---|---|---|
| CN | 104309122 | 1/2015 |
| WO | WO 2014/197732 | 12/2014 |
| WO | WO 2015/009938 | 1/2015 |

* cited by examiner

HYBRID ADDITIVE MANUFACTURING METHOD

CROSS REFERENCE TO RELATED APPLICATIONS

This application claims priority to and the benefit under 35 U.S.C. § 119(e) to U.S. Provisional Patent Application Ser. No. 62/212,401, filed Aug. 31, 2015, and U.S. Provisional Application Ser. No. 62/265,858, filed on Dec. 10, 2015. Each of these references is incorporated in their entirety by reference.

FIELD OF THE INVENTION

This invention relates to additive manufacturing. More specifically, the invention relates to a hybrid additive manufacturing method and apparatus using a thermoplastic and resin or epoxy. The invention also relates to the device made using the method and apparatus.

BACKGROUND

Additive manufacturing (AM), colloquially referred to as 3D printing, is the process of building a three-dimensional object by adding the necessary materials layer by layer. The term "3D printing" encompasses a number of additive manufacturing techniques including fused filament fabrication (FFF), select laser sintering (SLS), and stereolithography (SLA). These methods are described in more detail in the following U.S. patents and patent publications, all hereby incorporated by reference in their entirety: U.S. Pat. Nos. 4,575,330, 5,597,520, 7,959,847, 5,247,180, 8,252,223, U.S. Patent Pub. No. 2014/0268604, U.S. Pat. Nos. 4,078,229, 5,121,329, 6,103,176, 5,637,175, and 8,827,684.

The FFF process is based on a thermoplastic filament fed through a heated extrusion nozzle at a controlled rate and deposited as a continuous feed of molten plastic at discrete locations on a build plate. The FFF process uses a three axis platform typically actuated with stepper motors and an extruder assembly composed of a plastic filament driver and a hot end. Careful control of printing parameters allows complex geometries to be constructed.

The two major part components can be manufactured using the FFF process are shells and infill. Shells are the outermost layers that form the part's geometry while infill is the interior support for the shells. High infill percentages help to increase strength of printed parts by providing more structural support. However, there is a tradeoff between build time and part strength as dictated by infill. The FFF process uses thermoplastics such as polylactic acid (PLA), acrylonitrile butadiene styrene (ABS), high impact polystyrene (HIPS), and various polyamides (Nylons).

SLA uses photo-curable resins and a light source such as a laser or Digital Light Processing™ (DLP) (Texas Instruments Corp.) projector to cure each successive layer in a part. Liquid photopolymer resin is selectively bombarded with focused light to cure the photopolymer to a solid state. Typically, SLA uses a vat of photopolymer with a height-adjustable build plate that enables layer-based manufacturing. UV light is commonly used to cure the photopolymer in a layer pattern specified by software. SLA uses a laser to trace each layer while a DLP SLA machine uses a digital projector to cure an entire layer at once, decreasing build time. The SLA AM method also typically results in higher resolution parts than FFF. Material properties (e.g. percent elongation, tensile strength, brittleness, etc.) vary greatly in SLA due to the large number of photopolymer blends available and inconsistent material properties among blends. Disadvantages of SLA include UV stability, brittleness, warping, internal stresses and cure imperfections such as air pockets.

Composites combine multiple materials to achieve desired material properties not feasible through the use of one bulk material. Typically, composites encompass a support matrix, such as an epoxy, reinforced with a phase material such as carbon fiber, fiberglass, or metal fiber. Composite parts exhibit different failure modes than single-material parts. Composite failure modes can be classified as a matrix failure, where the bonding between the matrix and fiber fails, or a phase failure, where the fibers themselves fail. These failure modes are more akin to AM part failures where failure typically occurs at layer boundaries. While multi-material approaches are used in AM with features like dissolvable material and color printing, multi-material processes can also be used to achieve desirable mechanical properties as seen in composites. Current composite FFF technologies have been classified into three categories including reinforced filaments, doped filaments, and ultrasonic/thermal embedding.

AM has gained a tremendous amount of interest among engineers, scientists, and the maker community over the last decade. Several AM processes such as FFF and SLA have recently become affordable for a broad range of applications and have spurred the rapid adoption of AM in many different industries such as aerospace, automotive, medical, and advanced manufacturing. Driven by several factors including rapid low production volume part runs, specialized tooling requirement elimination, and reduction of penalization for part complexity, AM is changing the way low production volume parts are manufactured. However, the benefits of AM come with several challenges and opportunities for improvement. AM contains a whole new set of challenges typically absent in subtractive manufacturing (SM) processes such as delamination failures, large internal stresses, and porosity. FFF and SLA, two most widely used AM methods for plastics, face significant issues for production run part adoption. One such issue is the material properties of the printed parts. Layer-based manufactured parts have a unique set of failure modes that are not generally found in SM parts and are more akin to failures found in composite materials. Furthermore, mechanical properties of AM parts produced by economical commercial options are inconsistent across production runs due to process variations (e.g. extruder temperature, ambient temperature, bed temperature, extrusion rate, print speed, etc.).

Various methods to strengthen inter-layer bonding are available such as increasing extrusion nozzle temperature, decreasing layer height, elevating build volume temperature, and additional techniques primarily focused on increasing polymer chain interactions between layers. The tensile strength gains are still modest and do not equal or surpass bulk material properties. While polymer AM processes such as FDM and SLA can produce quality non-load bearing parts, there is a need for an alternative capable of producing economical load bearing-parts.

FFF and SLA have additional issues. These methods are notoriously slow at producing objects and have limited compatible materials, limiting the commercial viability of AM. Accordingly, there is also a need for a process and device which improves the print times and can be used with a wide range of materials to improve the range of achievable part properties.

SUMMARY

The present invention relates to a method that utilizes a hybrid of thermoplastic extrusions and liquid polymers to allow for faster print times and a broader range of part properties. FFF-SLA ("F3SLA") uses a FFF thermoplastic shell filled with up to 100% volume percentage with a liquid resin (e.g. photopolymer, thermoset, epoxy, etc.). The resulting parts have several beneficial properties. The parts have a wider range of available mechanical properties than FFF alone, more rapidly print to completion than FFF with larger infill percentage, require less expensive equipment than SLA processes, and include greater UV stability than SLA parts due to thermoplastic shielding.

The present invention can be utilized to create a composite material with high tensile strengths, but with FFF and SLA polymers. An aspect of the invention is a method to form a product that can create more consistent material properties by creating more uniform internal material structures. Additionally, the present invention can be used to strengthen parts by using a filler material. The filler can be a metallic material, a fabric material, a polymer material, a fiber, a lattice, or a secondary material. By way of example, the filler can be a carbon fiber lattice.

Another aspect of the present invention to provide a method for enhancing the speed and efficacy of an additive manufacturing process, which includes extruding a base layer of thermoplastic, extruding a thermoplastic outer boundary layer, extruding a thermoplastic support infill, depositing a liquid polymer between the thermoplastic support infill, repositioning the extruders to a second location, curing the liquid polymer, and repeating the prior steps until desired product formed, and extruding a top layer of thermoplastic.

Another aspect of the present invention is an apparatus for additive manufacturing having a platform adapted for deposition of thermoplastic, a thermoplastic extruder for extruding thermoplastic in a predetermined location at a predetermined thickness, a photocurable resin extruder for extruding photocurable resin in a predetermined location at a predetermined thickness, a UV-shielded location for shielding the polymer, which can be a photocurable resin extruder from UV light while using the UV light to cure the photocurable resin in the infill area.

Another aspect of the invention is a device made from the process or apparatus.

An aspect of the invention is a method to produce a thermoplastic and filled material part. The method includes producing a shell. The shell includes at least one layer of a thermoplastic material and is produced by fused filament fabrication. At least one layer of a filler material is added to the shell. The filler material is a photo-curing resin, an epoxy and combinations thereof. The filler material is cured to produce the thermoplastic and filled material part.

An aspect of the invention is an apparatus for additive manufacturing of a thermoplastic and filled material device. The apparatus includes a platform to support the thermoplastic and filled device during manufacturing. A thermoplastic extruder provides at least one layer of a thermoplastic material to a specific location on the platform through a thermoplastic nozzle to produce the shell. A filler extruder provides at least one layer of a filler material to the shell through a filler nozzle. The filler material is a photo-curing resin. A curing source is then used to cure the filler material.

An aspect of the invention is a device constructed from a hybrid additive manufacturing using a thermoplastic and filled material. The device includes a shell. The shell includes a thermoplastic material and is produced by fused filament fabrication. The device also includes an infill structure. The infill structure is produced by the fused filament fabrication. At least one layer of a filler material is provided to the shell. The filler material is a photo-curing resin, an epoxy or a combination thereof. The shell and the infill structure are filled with a filler material using stereolithography. At least one reinforcing material is added to the filler material before curing. The filler material including the reinforcing material is cured to produce the thermoplastic and filled device.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figures 1, 2:
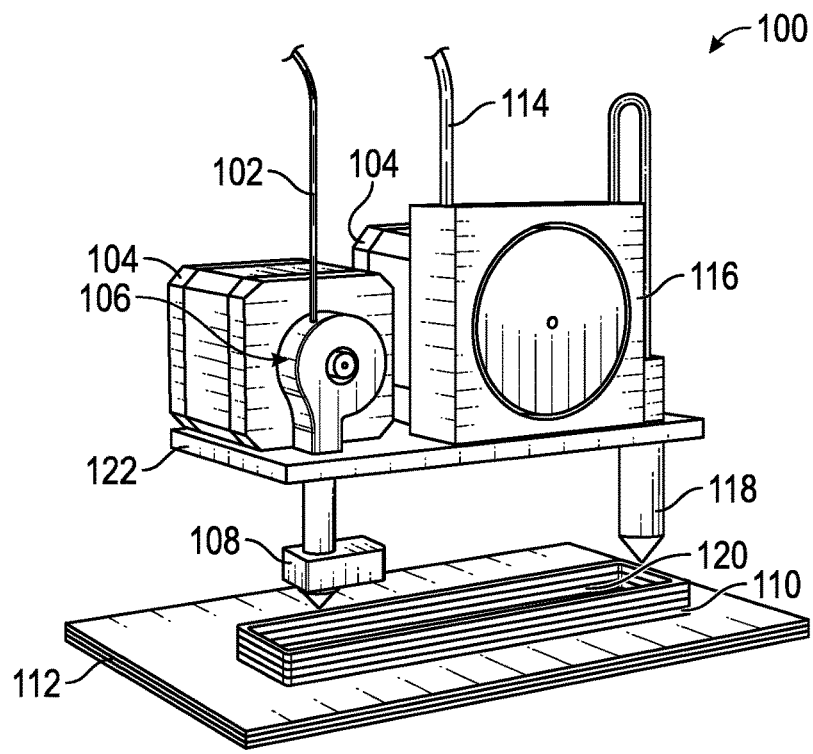
FIG. 1 illustrates a front prospective view of an embodiment of a F3SLA 3D printing apparatus including the thermoplastic extruder, photopolymer extruder, and stepper motors.
FIG. 2 illustrates a front prospective view of an embodiment of a RF3SLA 3D printing apparatus including the thermoplastic extruder, photopolymer extruder, fiber extruder, and stepper motors.

An aspect of the present invention utilizes a method to, layer by layer, print and form a thermoplastic shell with minimal or no infill. At the end of every layer (with the thermoplastic being at least one layer ahead) a photopolymer is deposited into the void of the thermoplastic. After the photopolymer has been deposited, the photopolymer deposition head can move such that it is not exposed to a UV light. A curing source passes overhead at the correct speed to allow for full curing of the liquid photopolymer. The thermoplastic and photopolymer deposition process is repeated onto the previous layer until the completion of the infill layers for the entire part. After the infill layers have been printed, the part can be capped with the thermoplastic.

Another aspect of the present invention is a method to produce a thermoplastic and filled material part. The method includes producing a shell, where the shell comprises at least one layer of a thermoplastic material. The shell is produced using fused filament fabrication. At least one layer of a filler material is added to the shell. The filler material is a resin, photo-curing resin, an epoxy and combinations thereof. The filler material is cured, producing the thermoplastic and filled material part.

An aspect of the invention is a method to produce a device comprising a thermoplastic, a reinforcing material, and filled material. A shell is produced by fused filament fabrication. The shell can be made of a thermoplastic material. An infill structure can also be produced by the fused filament fabrication, and made of a thermoplastic material. A filler layer can be provided to the shell. The filler material is a photo-curing resin, an epoxy and combinations thereof. The filler material is provided to the shell and the infill structure by stereolithography or other suitable curing process (i.e. exposure to different wavelengths). At least one reinforcing material is provided to the layer of the filler material before curing. The layer material is then cured to produce a thermoplastic, reinforced and filled material part.

Preparation

The general AM toolchain includes computer aided design (CAD), a slicer, host software, the AM machine, and post processing. Suitable CAD programs include, Auto-CAD, and Solid Works. The part can be designed for AM in CAD and can be saved as a mesh format, such as a STL or Initial Graphics Exchange Specification (IGES) file, or another proprietary format. This file can be converted into toolpaths via a program like G-code, "Slic3r", or similar programs using a slicer. A slicer can take the 3D design and format it as 2D slices that can be understood by the printer. The host software package can be installed on the printer itself or operated via an external computer. Host software can be loaded onto an external computer or AM microcontroller can integrate the slicer and printer controller into one package. Once the code has been generated, it can be uploaded to the AM machine and the printing operations can be carried out resulting in a geometrically finished part. Depending on the AM technology and specific application, post processing can be utilized to obtain a finished part. The AM toolchain can simplify the traditional SM toolchain by eliminating several time-consuming steps including drafting and tooling.

Fused Filament Fabrication of the Base, Shell and Infill Structure

The FFF process is based on a thermoplastic filament fed through a heated extrusion nozzle at a controlled rate and deposited as a continuous feed of molten plastic at discrete locations on a build plate. The build plate can be heated depending upon the specific system and thermoplastic being used. The build plate temperature can vary depending on the type of material and the build plate material (e.g. glass, aluminum, etc.). In embodiments where the build plate is heated, the temperature of the build plate is below the glass transition temperature of the extruded material type. The FFF process can use a three axis platform, which can be actuated with stepper motors and an extruder assembly composed of a plastic filament driver and a hot end. The FFF process can be used to build a part layer by layer. Careful control of printing parameters can complex geometries to be constructed. The two major manufacturing techniques that are used to produce a part using the FFF process are shells and infill. Shells, as used herein, are the outermost layers that form the geometry of the part. Infill or infill structure, as used herein, is the interior support for the shells that can come in many different forms, including but not limited to, rectilinear, conical, honeycomb, or combinations thereof. The infill structure can be the same material or a different material from the shell material. Furthermore, different materials can be used for the infill structure. While the part can include both the shell and the infill, it is understood that in some embodiments, the shell can be used without the infill. High percentages of the infill structure can increase the strength of printed parts by providing more structural support. Some optimization of build time and part strength can be achieved through an advantageous build orientation aligning filament strands with application loads.

The part can further include at least one base layer. The base layer can be provided to prevent or decrease seepage of the filler material. At least one base layer can be used, in some embodiments can be between about 2 and 5 layers. The base layer can be the same material or a different material from the shell. In some embodiments, the base layer or the shell can be temporarily bonded to a plate during manufacturing to prevent or reduce curing of the shell material during manufacturing. Following manufacturing, the temporary bond can be removed. Suitable temporarily bonding agents include but not limited to super glue, instant adhesives, temporary adhesives, or combinations thereof.

Suitable thermoplastic materials can include, PLA, ABS, HIPS, and various nylons. Combinations of these thermoplastics can be used. Furthermore, different thermoplastics can be used in different portions of the part. For example, at least one polymer material can be used for a bottom of the shell, while a different material can be used in the infill, while a second material can be used for the top end of the shell.

The discrete deposition of material in AM technologies can enable the feasibility of complex multi-material components. In some embodiments, FFF can include a filament. FFF technologies can include at least three categories including reinforced filaments, doped filaments, and ultrasonic/thermal embedding. The thermoplastics can include a fiber-reinforced core composed of fiberglass, poly(imino-1, 4-phenyleneiminocarbonyl-1,4-phenylenecarbonyl) (Kevlar®), carbon fiber, or combinations thereof. The amount of the fiber in the end product can vary to achieve different material properties. Thus, the fiber content can be between 0% by volume and about 99% by volume. At least two extruders can allow the fiber-reinforced thermoplastic to be laid in orientations specified by the operator. The fiber reinforced filament process can be limited to laying reinforcement in only the X-Y axis.

Polymer Filling Method and Material

A filler material can be added to the part using any suitable method, including stereolithography, composite addition, manual filling, or combinations thereof. In some embodiments, a F3SLA method can be used that combines the steps of making the shell and infill and filling the shell with a filler material. In some embodiments, a filler can be added to a part that has previously been fully or partially manufactured using FFF.

Prior to the addition of the filler material, at least a portion of the shell or the infill can be treated to improve adhesion of the filler material to the shell or infill. Suitable methods to increase adhesion include chemically etching the surface of the shell or infill (with a suitable acid), or roughing the surface of the shell or infill, for example by soda blasting, sand blasting, sanding, and the like. After the surface is treated, it can be cleaned using a polar or non-polar solvent or solution, which can include a polar solvent and a non-polar solvent. Suitable polar solvents include isopropyl alcohol, ethanol, methanol, acetic acid, acetone, water, and combinations thereof. Suitable non-polar solvents include hexane, heptane, benzene, toluene, chloroform, diethyl ether, pentane, and combinations thereof. The cleaned parts can be dried at a temperature between about 25° C. and about 100° C. (or any temperature below the glass transition temperature of the thermoplastic), for between about 1 minute to about 48 hours, or until the solvent or solution has evaporated.

Stereolithography (SLA) uses photo-curable resins and a light source such as a laser or Digital Light Processing™ (DLP) (Texas Instruments, Inc.) projector to cure each successive layer in a part. Liquid photopolymer resin can be selectively bombarded with focused light to cure the photopolymer to a solid state. SLA can use a vat of photopolymer with a height-adjustable build plate that enables layer-based manufacturing. Any suitable light source capable of achieving the required wavelength as determined by the photo-curable resin can be used. In some embodiments, a UV light, laser, flood light, or other suitable light source for a particular resin material that can be used to cure the material can be the light source. The light source can trace each layer to cure the material. In some embodiments, a DLP SLA machine can be used with a digital projector to cure an entire layer at once, decreasing build time. In some embodiments, a SLA AM method can be used, which can result in higher resolution parts than FFF. Material properties, for example percent elongation, tensile/compressive strength, brittleness, and combinations thereof, can vary in SLA due to the large number of photopolymer blends available and inconsistent material properties among blends.

In some embodiments, the shell can be manually filled with the filler material. The filler material can be added with using any suitable method or tool, including a syringe to manually insert the filler material. The filler material can be a photo-cure resin or photopolymer, or an epoxy material. The material can be added layer by layer and cured layer by layer. For example, if the material was a photo-cure resin, a handheld light can be used to cure each layer. If the material is an epoxy, the parts can be placed in an oven or allowed to dry before another layer is added. In some embodiments, the filler material can be added in its entirety and cured thereafter pursuant to the curing procedure for the material.

In some embodiments, an epoxy can be added to the shell using an apparatus. The filler can be added layer by layer and cured layer by layer, or the epoxy can be added in its entirety, then cured.

In some embodiments, a vacuum can be used to remove air bubbles in the filler material prior to curing. In some embodiments, the part comprising the shell and any infill structure can be filled with at least a portion of the filler material. The part can be placed into a chamber and a vacuum applied to the part with the filler material. Any suitable vacuum pressure can be used to reduce air bubbles in the filler material. By way of example, a vacuum pressure of between about 5 psi and about 100 psi can be applied to the part for between about 10 seconds and about 2 minutes (or until the material falls). One skilled in the art would understand that the filler can lose components required for curing if the filler is subjected to a vacuum for an extended period of time. The part can be slowly brought back to standard pressure. In some embodiments, the material can be degassed prior to deposition.

In some embodiments, air bubbles can be removed from the filler material by agitating the product prior to curing. Agitation can occur in any suitable method known in the art, including a mechanical agitation (for example a shaker table), ultrasonic agitation, or combinations thereof.

Suitable resins or photo-curable resins will depend upon the final application and properties desired in the final product. One suitable photo-polymer is MakerJuice (primary ingredient acrylate ester). One skilled in the art would understand that a suitable wavelength used to cure a photo-curable resin will depend upon the resin. In broad terms, suitable wavelengths can be between 100 nm and 500 nm. Suitable exposure times can also vary, but can be between 1 ms and about 1 hour.

Any suitable epoxy can be used. By way of example only, two part epoxies or quick set epoxies can be used. In some embodiments, at least one filler material can be used. Thus, combinations of photo-curable resins, and epoxies can be used with the invention.

Composites combine multiple materials to achieve desired material properties not feasible through the use of one bulk material. Composites can include a support matrix, such as an epoxy or ceramic, and can be reinforced with a phase material such as carbon fiber or particles, fiberglass, metal fiber or particles, Kevlar®, carbon fiber, a pliable fiber, nylon, polymers, and combinations thereof. At least one reinforcing material can be included in the filler or added after the filler has been deposited. The reinforcing material can be included prior to curing the filler material.

Fibers can have uniaxial aligned molecular units giving them uniaxial mechanical properties. Composites can take advantage of the high strength in one direction of fibers by orienting fibers in the direction of anticipated loading. Fiber reinforcement of composites includes three main categories including short fibers, long fibers, and global fibers.

Short Fiber Reinforced Polymers (SFRP) can distribute short reinforcement fibers embedded in the matrix to provide localized reinforcement. SFRP material properties can depend on two main parameters including the fiber length distribution and the fiber orientation distribution. Short fiber reinforcement can be used in injection molding and many different methods for determining and/or predicting fiber orientation exist including models and experimental approaches. Typically, SFRP materials can exhibit anisotropic material properties due to a majority of fibers aligning along the flow direction of the matrix material. The critical fiber length is the length of fiber needed to obtain an effective mechanical property benefit (e.g. higher strength, lower strain).

Long Fiber Reinforced Polymers (LFRP) are similar to SFRPs with one key difference: longer fibers. Fiber lengths of greater than about 6.35 mm (~0.25 inch) typically result in composites being classified as LFRP, though it is understood that this distinction can be somewhat arbitrary. LFRP composites can be used in many industries (e.g. aerospace, automotive) because of their distinct mechanical properties (primarily strength/weight ratio) and ability to be processed in existing manufacturing process (e.g. injection molding). Fiber length is not the sole parameter to optimize when designing a composite as it is also important to look at orientation, shear strength of the matrix, surface finish of the fibers.

Global Fiber Reinforced Polymers (GFRP), also known as Continuous Fiber Reinforced Polymers (CFRP), use identical matrix and phase materials to SFRP and LFRP but use even longer fibers. As with the distinction between SFRT and LFRT composites, the distinction between LFRT and CFRT is not clearly defined. CFRP composites can be used for specific material properties (e.g. high strength, high impact resistance, etc.) although CFRPs can be more difficult to manufacture than SFRT and LFRTs.

The composite can further include dopants. Doping of filaments can also be used to incorporate multiple materials in AM to achieve a desired set of material properties, including by way of example only conductivity, illumination, and textures. Doping materials can include metals, such as iron, silver, copper, and combinations thereof; diamond; ceramics, including alumina; organics, including carbon or carbon containing materials, including graphene or carbon black; and combinations thereof. The dopant can be a fiber, particle, or combinations thereof. The amount of the doping materials can vary depending on the application, but in general, the amount of doping material can vary between 0.01% and 5% of overall composite material.

Since the fiber reinforcement can support the main load while the support matrix holds the entire part together, fiber orientation can assist in the strength of the part. Many different techniques can be used to manufacture composites from hand layup to semi-automated or fully automated processes, including but not limited to resin transfer molding (RTM), resin injection molding (RIM), and vacuum-assisted resin transfer molding (VARTM).

The amount of filler material in the part can depend upon the infill structure. By way of example, if the part comprised about 50% by volume of the infill structure, then at most the filler can provide the remaining 50% by volume of part. In some embodiments, the part can comprise between about 0 vol. % and about 99 vol. % of the filler material.

Following processing, the entire part can be put into an oven or light chamber to further cure the part.

F3SLA

F3SLA is a hybrid AM process that can utilize the FFF process and SLA process. In some embodiments, the hybrid AM process can be automated. The hybridization of FFF and SLA processes overcomes material limitations of each process resulting in a broader range of mechanical properties such as tensile strength, brittleness, UV stability, etc. The practical implementation of F3SLA differs from typical multi-extruder FFF printers.

An aspect of the invention is an apparatus for additive manufacturing of a thermoplastic and filled material device. The apparatus includes a base plate, a thermoplastic extruder, a filler extruder and a light source. The thermoplastic extruder provides at least one layer of a thermoplastic material to a specific location on the platform. The filler extruder provides at least one layer of a filler material to a shell produced by the thermoplastic extruder. The filler material is a photo-curing resin. The light source can cure the filler material. The thermoplastic extruder can also be used to add a base layer.

A F3SLA printer can utilize a standard FFF thermoplastic extruder for laying down the thermoplastic shells, and a stepper motor-driven peristaltic pump attached to a nozzle as the liquid photopolymer extruder. A light source can also be included on the gantry assembly of the F3SLA printer or mounted stationary above to build platform to cure the photopolymer in layered intervals. FIG. 1 illustrates an embodiment of a F3SLA print head system 100 setup. An external computer can be used to control pause points and gantry movements though custom code scripts in the build process. The system 100 includes a thermoplastic filament supply 102, extruder stepper motor 104, and a thermoplastic extruder 106 for extruding the thermoplastic through a thermoplastic hot end and nozzle 108. The thermoplastic external structure 110 is formed on a build platform 112. The liquid polymer supply line 114 provides the filler material to the system 100. A liquid polymer extruder 116, which can be a peristatic pump extruder, provides the filler material to the filler nozzle 118, which then fills the thermoplastic external structure 110 with the filler 120. The thermoplastic nozzle 108 and filler nozzle 118 can be moved using gantry 122, which can be a 3-axis gantry.

In some embodiments, an epoxy can be used in place of the liquid photopolymer, for example a two-part epoxy. The epoxy can be added as the filler to the part. Thus, while throughout the Specification filler may reference a photopolymer or photo-resin, one skilled in the art would understand that the liquid infill can be either a photo-resin/photopolymer or an epoxy. Furthermore, multiple liquid infills can be used to add different types of materials (i.e. different photo-resins/photopolymers or epoxy). Furthermore, when the epoxy is used as the filler, the light source can be a heater.

In some embodiments, the F3SLA can further include a fiber inlay extruder. This combination expands the material property design space and therefore results in more tunable material parameter options (e.g. strength, fatigue life, stiffness, etc.) for users. The fiber inlay extruder can provide fibers (or particles) to the liquid infill layers. Using fibers or particles in the liquid infill can strengthen parts by transferring loads from the liquid infill matrix to the reinforcement fibers via shear stress. Fiber reinforcement can be deposited in any direction depending on mechanical apparatus limitations to support different load configurations. This configuration allows a user to design the material properties of a structure itself, optimizing desired mechanical properties for specific applications.

FIG. 2 illustrates an embodiment of a RF3SLA extruder 200 configuration. Like the F3SLA, the RF3SLA includes a thermoplastic filament supply 202, extruder stepper motors, a build plate 212, and a thermoplastic extruder 206, a liquid polymer supply line 214 and a liquid polymer extruder 216. The RF3SLA system also includes a fiber supply 230. Three extrusion heads are included on a three axis gantry assembly 222 including a thermoplastic extruder nozzle 208, a liquid resin extruder nozzle 218 (one extruder in the case of photopolymers and one part epoxies or resins, two extruders in the case of two part epoxies or resins), and a fiber extruder nozzle 224. The fiber extruder nozzle 224 on the fiber extruder 226 can lay fibers into a layer of liquid resin 220 (in the thermoplastic structure 210) in the desired pattern, direction, and fiber length as specified by the designer or machine operator. The liquid resin 220 can then be cured/photoset after the fibers have been inlayed. The next thermoplastic shell layer can be constructed, liquid resin can be added, and the process can be repeated until the desired part geometry is completed. Control of the three extruders can be performed manually or with software and hardware without deviating from the invention. In some embodiments, the apparatus is controlled through g-code that can be generated either manually or in a custom slicer.

Figure 3:
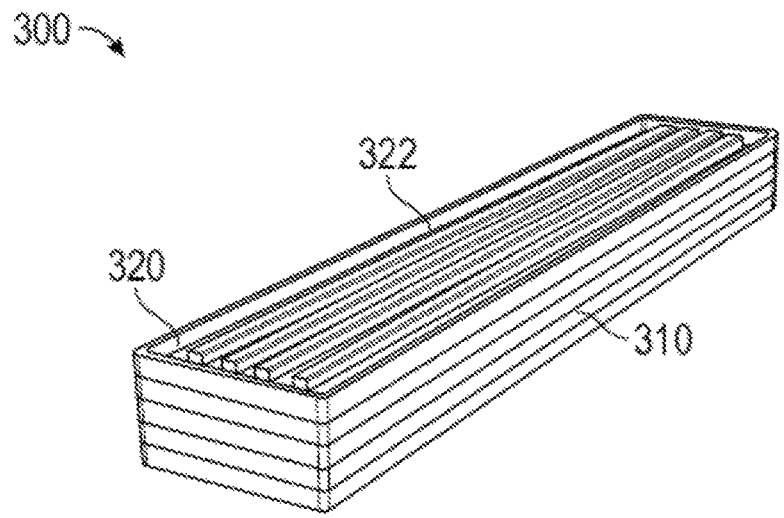
FIG. 3 illustrates a generic RF3SLA sample part.

FIG. 3 illustrates a generic RF3SLA sample part 300. The thermoplastic outer structure layers 310 are over emphasized by the change in color tones. Multiple layers of continuous fiber reinforcement 322 can be layered within the liquid infill 320. Several fiber-inlay extruder designs allow for continuous global fiber reinforcement deposition, long fiber reinforcement deposition, or short fiber reinforcement deposition depending on the intended application.

An aspect of the invention is the automation of F3SLA and RF3SLA systems. While RF3SLA systems are discussed in detail, it is understood that a F3SLA system would be similar as the F3SLA process is identical to the RF3SLA process but does not include fiber-reinforcement deposition.

Figure 4:
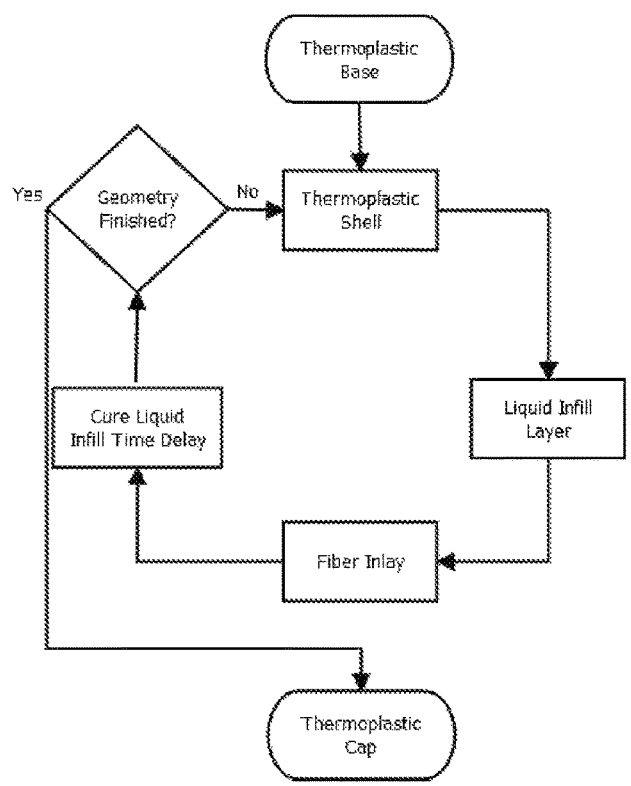
FIG. 4 illustrates a flow diagram of the RF3SLA process.

FIG. 4 illustrates a flow diagram of the RF3SLA process. RF3SLA manufactures composites through thermoplastic shells and liquid infill support. The process begins with the formation of a thermoplastic base. The thermoplastic base includes at least two layers, in some embodiments between 2-5 layers, of a thermoplastic material to minimize liquid infill seepage before curing. The thermoplastic base and the thermoplastic shell can be the same material or different materials. The thermoplastic shell can be constructed layer by layer. As the shell is built, the liquid infill extruder deposits liquid infill inside the thermoplastic shell. In some embodiments, the entire shell can be built prior to the liquid infill deposition, but before the infill layer is cured. The fiber deposition extruder can lay fiber-reinforcement in the pre-defined orientation. The liquid infill can then be cured or hardened depending on the infill type in use. The process can be repeated until the geometry is achieved. A thermoplastic cap can then seal the part and the RF3SLA process is finished.

Figure 5:
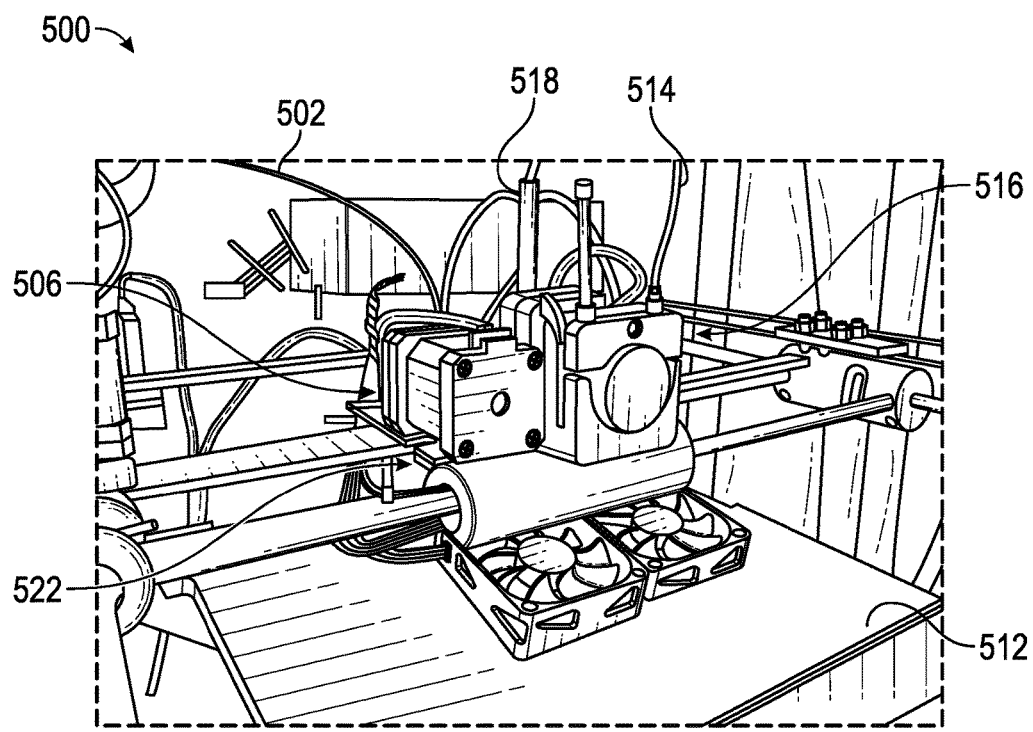
FIG. 5 illustrates an embodiment of an extruder setup installed on a RF3SLA printer.

FIG. 5 illustrates an embodiment of a RF3SLA printer 500. The stepper motor-driven peristaltic pump liquid infill extruder 516 is illustrated mounted next to the standard FFF thermoplastic extruder 506. A peristaltic pump was selected for liquid infill deposition to provide precise control over liquid flow, fast response time, identical control scheme to FFF extruders, easy cleanup, and easy transfer of liquid material supply lines. Other suitable pumps include screw, diaphragm, rotary, centrifugal, vacuum, single stage, multistage, or the like. Also illustrated in FIG. 5 is a thermoplastic filament supply 502, a build plate 512, a liquid polymer supply line 514, liquid resin extruder nozzle 518 and a three axis gantry assembly 522.

Figure 6:
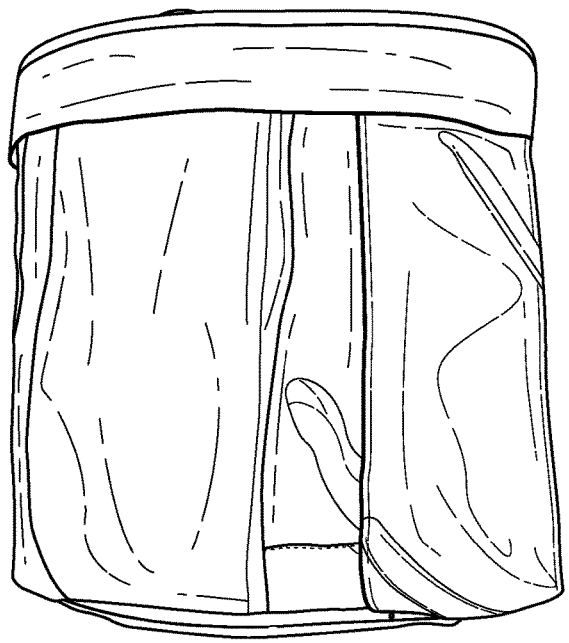
FIG. 6 illustrates a blackout enclosure and control computer over a RF3SLA printer.

As the process can utilize high intensity ultra-violet (UV) light for curing photopolymer infill, it can be beneficial to enclose the RF3SLA. FIG. 6 illustrates a blackout enclosure and control computer over a RF3SLA printer. Opaque photopolymer tubing and a shielded dump station can integrate the RF3SLA printer to protect uncured photopolymer in the supply tubing and nozzle residue from curing under UV bombardment.

An aspect of the invention is a thermoplastic, filled device. The device includes a thermoplastic shell. The shell is produced by fused filament fabrication. The device also includes a filler. The filler is an epoxy or a photo-curing resin. The filler is provided by stereolithography.

In some embodiments, the device can further include fibers or particles. The tensile strength of the device can be between about 0 GPa and about 3.5 GPa. The tensile strength can be between about 0% and about 5,000% stronger than a material not including the filler material. The device can include between about 0 vol. % and about 99 vol. % of an infill volume. The compressive strength of the device can be between about 1 GPa and about 12 GPa. The Young's Modulus of the device can be between about 0 GPa and about 138 GPa.

EXAMPLES

Thermoplastic Shell and Filler

Manual F3SLA testing allowed for the successfully validate F3SLA on the basis of material compatibility, dimensional accuracy, and layer height. Table 1 includes the parameters for the samples.

TABLE 1

| F3SLA Sample Parameters | |
|---|---|
| Host Software | Repetier-Host v1.6.0 |
| Slicer Software | Slic3r |
| Printer | MakerGear M2 (24 v) |
| Nozzle Diameter | 0.4 mm |
| Filament Diameter | 1.75 mm |
| Layer Height | 0.3 mm |
| Vertical Shells | 3 |
| Horizontal Shells | 3 Bottom, 3 Top |
| Infill Type | Honeycomb |
| Top/Bottom Fill Pattern | Rectilinear |
| Extruder Temperature | 230° C. |
| Bed Temperature | 100° C. |
| Standard Print Speed | 80 mm/s |
| Infill Print Speed | 80 mm/s |
| Solid Infill Print Speed | 50 mm/s |
| Top Layer Print Speed | 30 mm/s |
| First Layer Print Speed | 40 mm/s |
| Travel Speed | 90 mm/s |

Figure 7:
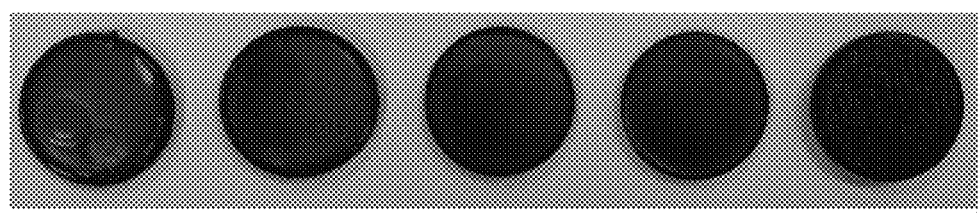
FIG. 7 illustrates several issues with increased layer height including air bubbles, liftoff, and warping.

Due to the external thermoplastic shell providing geometric dimensional accuracy and surface finish, a larger photopolymer layer height is advantageous in decreasing build time. FIG. 7 illustrates several issues with increased layer height including air bubbles, liftoff, and warping. In FIG. 7, layer height decreases from left to right. Air bubbles can be seen in the two leftmost samples while some degree of liftoff can be seen in all but the rightmost sample. A slower cure time (as determined by the material, blend, build plate material, part geometry, etc.) can decrease both liftoff and warping and can be achieved through less intensity, modification of wavelength for photopolymer curing, or decreasing exposure time. The rightmost sample indicates how ultra-thin layers can achieved minimal air bubbles, liftoff, and warpage. The layers illustrated in FIG. 7 are the first photopolymer layers of various heights therefore the ridges of the individual thermoplastic strands can be seen in the rightmost sample due to resin seepage between strands.

Figure 8:
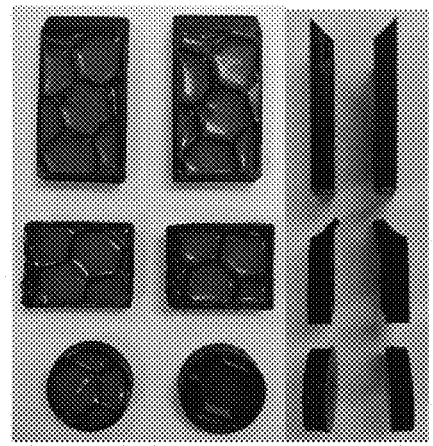
FIG. 8 illustrates several test samples with thermoplastic reinforcement showing complex geometries such as inclines and overhangs

Thermoplastic infill structures can be added to the F3SLA composite structures to minimize warpage, provide rigidity, and tune mechanical performance including yield strength, strain, and specific strength. Warpage, due to the exothermic photopolymer cure reaction, can be mitigated through thermoplastic reinforcement and an increase in build plate adhesion through the use of adhesives and/or elevated bed temperatures. FIG. 8 illustrates several test samples with thermoplastic reinforcement showing complex geometries such as inclines and overhangs. FFF geometry limitations are illustrated in the F3SLA samples (FIG. 8) such as high overhang angles yet these can be mitigated through the use of thermoplastic support material.

Mechanical Testing of Thermoplastic and Filler Samples

To evaluate F3SLA and determine the mechanical properties of interest for the test coupons (yield strength, strain, and percent elongation) both tensile tests and compressive tests were conducted. All test coupons were made in accordance to the American Society for Testing and Materials (ASTM) F2971-13—Standard Practice for Reporting Data for Test Specimens Prepared by Additive Manufacturing and ASTM D638-14—Standard Test Method for Tensile Properties of Plastics with minor modifications for the test setup. These modifications included reducing the overall length of tensile coupons to 5.5 inches by cutting both the clamp length and the reduced section to about 1 inch to maximize the number of test samples we could fit on the build plate in one orientation. The reduced cross section was left unmodified to stay as close to the ASTM standards as possible for the test setup. A type II style test coupon was chosen over a type I in order to promote failure within the reduced region as per ASTM D638-14 recommendations.

A one-inch cube was used for the compressive sample geometry because of the simplicity, ease of manufacture, and flat surface for accurate 2D Digital Image Correlation (DIC) optical strain analysis. DIC is a full field measurement technique that compares digital images recorded throughout a material test to optically determine displacement and strain. The DIC technique allowed visualization of multi-material interactions across tensile loading to failure giving insight on the compatibility of various materials and effectiveness of load transfer throughout the AM composites by tracking changes in a black and white speck pattern.

All coupons were manufactured from HATCHBOX PLA filament (silver) bought in the same purchase order and only unsealed directly before each print run to get similar bulk material properties. MakerJuice LABS G+ v5 3D printing resin was used for the UV curable resin throughout the examples. This resin was chosen because it is a general purpose resin that is easy to work with and widely accessible. The adhesion between the photopolymer filler and thermoplastic structure was also analyzed.

Tensile and Compression Test Set-Up

Figure 9A:
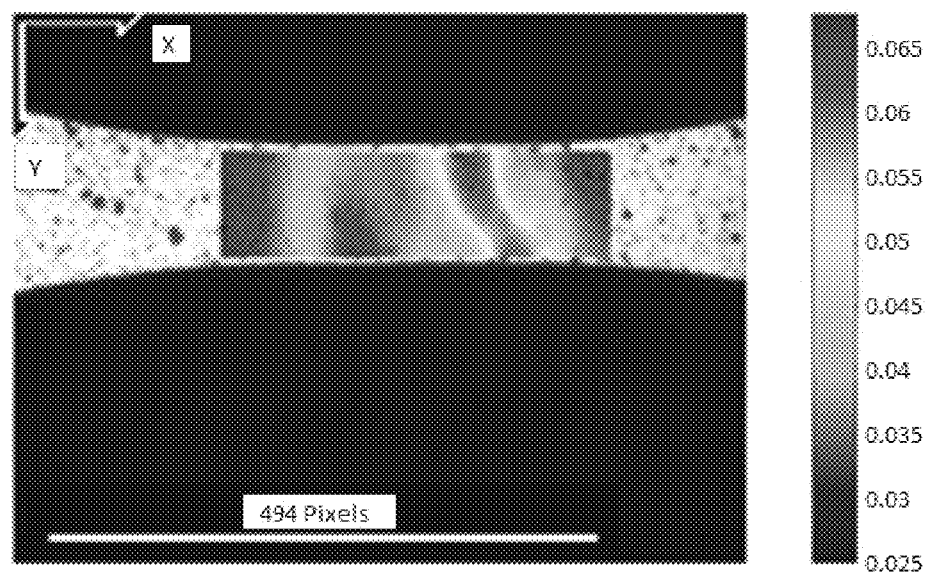
FIG. 9A illustrates a 2D DIC strain field overlain for an about 0% infill thermoplastic (FFF)
Figure 9B:
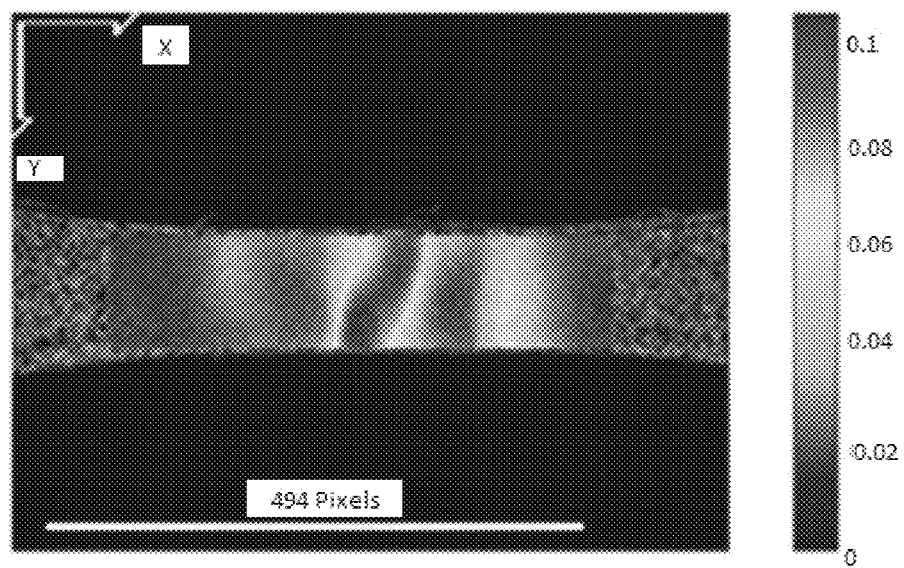
FIG. 9B illustrates a 2D DIC strain field overlain for an about 20% infill thermoplastic (FFF)
Figure 9C:
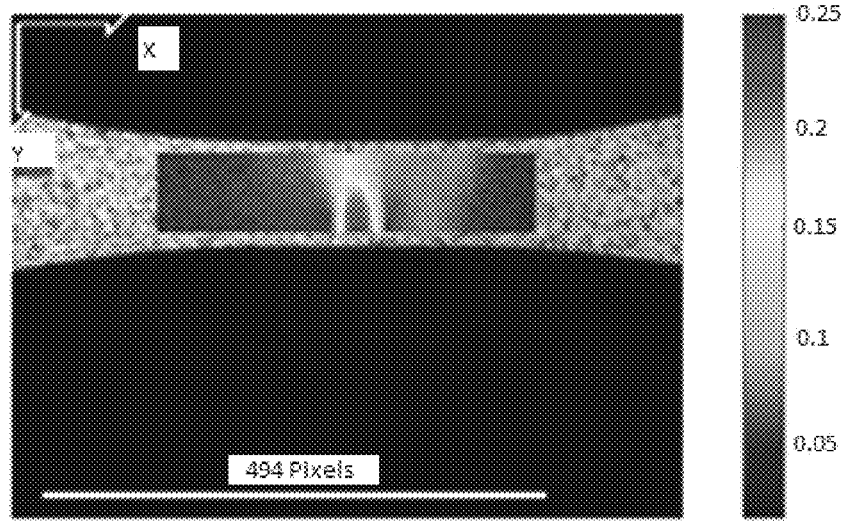
FIG. 9C illustrates a 2D DIC strain field overlain for an about 100% infill thermoplastic (FFF)
Figure 9D:
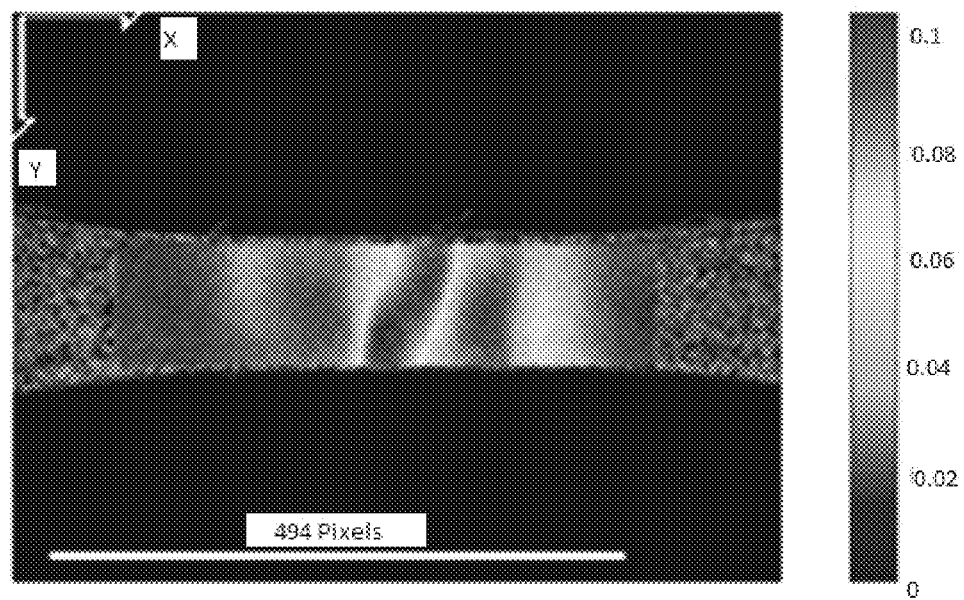
FIG. 9D illustrates a 2D DIC strain field overlain for an about 10% thermoplastic infill 90% photopolymer (F3SLA)
Figure 9E:
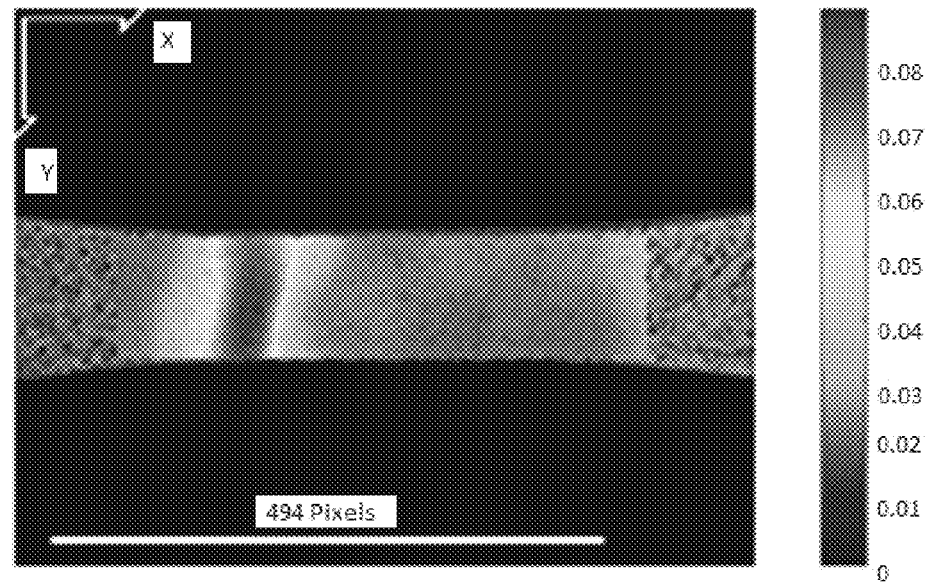
FIG. 9E illustrates a 2D DIC strain field overlain for an about 10% infill thermoplastic (FFF)
Figure 9F:
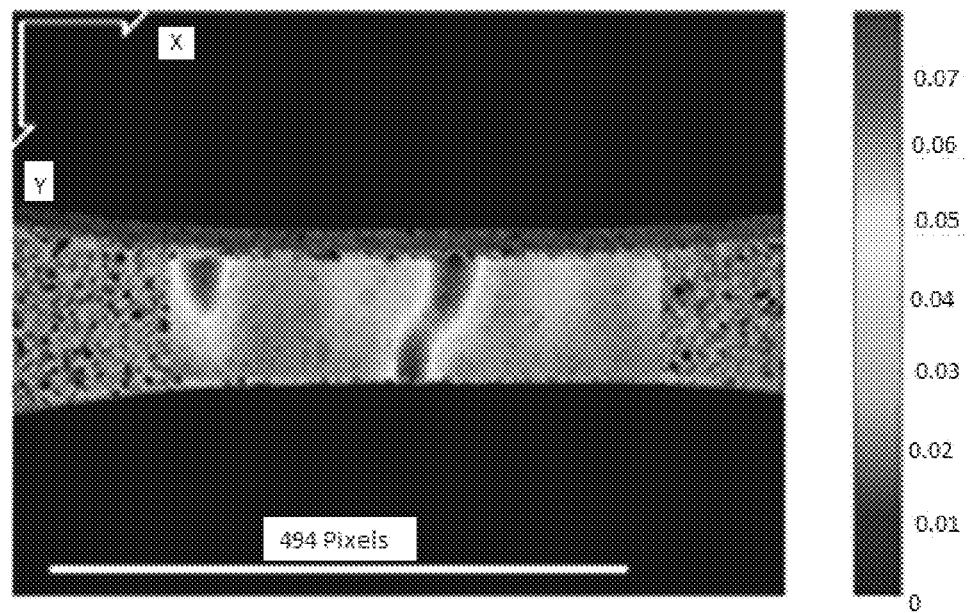
FIG. 9F illustrates a 2D DIC strain field overlain for an about 50% infill thermoplastic (FFF)
Figure 9G:
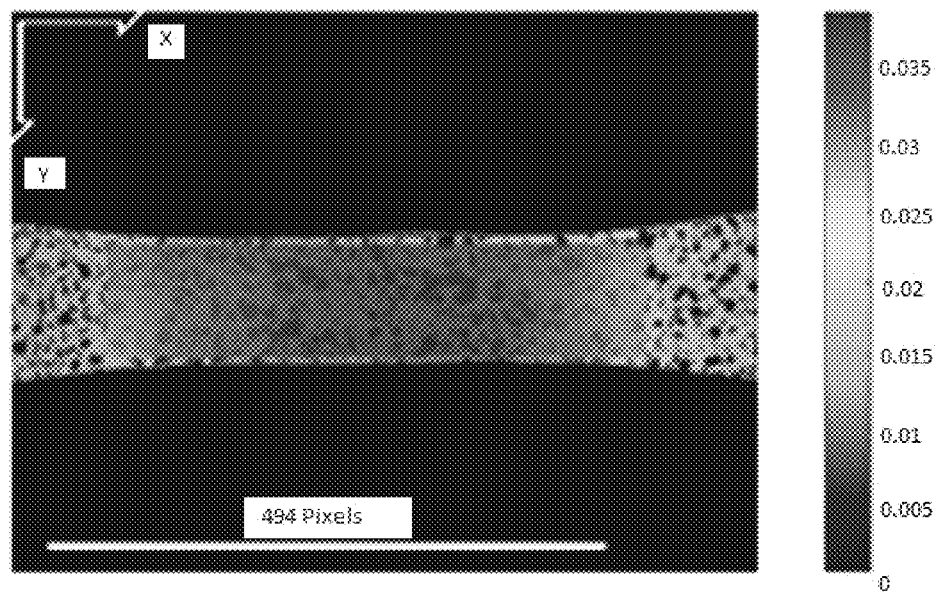
FIG. 9G illustrates a 2D DIC strain field overlain for an about 100% infill photopolymer (DLP)
Figure 9H:
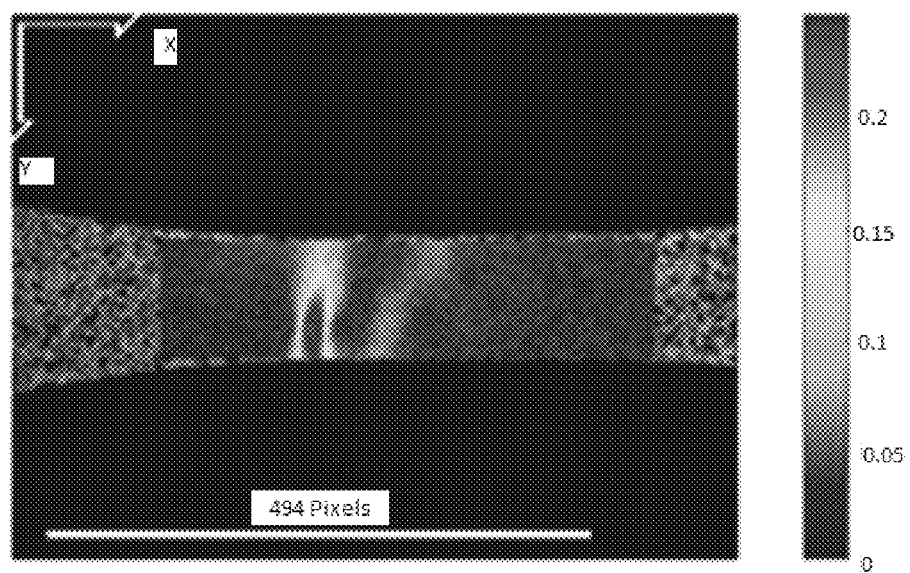
FIG. 9H illustrates a 2D DIC strain field overlain for an about 20% infill thermoplastic, 80% photopolymer (F3SLA)

A 2D DIC optical strain was used to analyze the displacement acquisition and strain measurement throughout the tensile and compressive case studies. The optical approach allowed for local measurements of the strain across the testing region to fully investigate multi-material interaction and failures. Ncorr, an open source DIC program, was used to perform DIC analysis on the tensile data. Images taken throughout the tensile and compressive loading of test coupons were processed by localized tracking of a black and white speckle pattern on each coupon. FIGS. 9A-9H illustrate a 2D DIC strain field overlain on a variety of samples. The 0% infill thermoplastic (F3SLA) case refers to a thermoplastic shell filled with resin but no honeycomb thermoplastic reinforcement. The 0% infill thermoplastic FFF case is the shell with no infill or filler. FIG. 9A illustrates a 2D DIC strain field overlain for an about 0 vol. % infill thermoplastic (FFF). FIG. 9B illustrates a 2D DIC strain field overlain for an about 20 vol. % infill thermoplastic (FFF). FIG. 9C illustrates a 2D DIC strain field overlain for an about 100 vol. % infill thermoplastic (FFF). FIG. 9D illustrates a 2D DIC strain field overlain for an about 10 vol. % thermoplastic infill 90 vol. % photopolymer (F3SLA). FIG. 9E illustrates a 2D DIC strain field overlain for an about 10 vol. % infill thermoplastic (FFF). FIG. 9F illustrates a 2D DIC strain field overlain for an about 50 vol. % infill thermoplastic (FFF). FIG. 9G illustrates a 2D DIC strain field overlain for an about 100 vol. % infill photopolymer (DLP). FIG. 9H illustrates a 2D DIC strain field overlain for an about 20 vol. % infill thermoplastic, 80 vol. % photopolymer (F3SLA).

To perform DIC analysis during testing, samples were prepared by speckling the testing region. This process started with a light coat of white paint to provide a smooth, flat background. It was important to sufficiently coat the testing region to a point where the individual filament strands were not visible yet thin enough to minimize impact on the mechanical properties of the coupon. The second part of speckling involved misting the coupons with a black paint to a near 50-50 black and white balance. A consistent coating method was used throughout the examples.

Table 2 provides and overview of the samples including both tensile and compressive sample cases. F3SLA samples were manufactured using a FFF process and manual photopolymer infill process as shown in FIG. 3.2. All F3SLA samples used honeycomb thermoplastic infill structures and all values in the table are approximate.

TABLE 2

| Sample Process | Loading | Shell Material | Thermoplastic Infill (vol. %) | Photopolymer Infill (vol. %) |
|---|---|---|---|---|
| FFF | Tensile | Thermoplastic | 0 | 0 |
| FFF | Tensile | Thermoplastic | 10 | 0 |
| FFF | Tensile | Thermoplastic | 20 | 0 |
| FFF | Tensile | Thermoplastic | 50 | 0 |
| FFF | Tensile | Thermoplastic | 100 | 0 |
| DLP | Tensile | N/A | 0 | 100 |
| F3SLA | Tensile | Thermoplastic | 0 | 100 |
| F3SLA | Tensile | Thermoplastic | 10 | 90 |
| F3SLA | Tensile | Thermoplastic | 20 | 80 |
| FFF | Compressive | Thermoplastic | 0 | 0 |
| FFF | Compressive | Thermoplastic | 10 | 0 |
| FFF | Compressive | Thermoplastic | 100 | 0 |
| DLP | Compressive | N/A | 0 | 100 |
| F3SLA | Compressive | Thermoplastic | 0 | 100 |
| F3SLA | Compressive | Thermoplastic | 10 | 90 |

Uniaxial tension and compression tests were used to measure material characteristics of both control cases and F3SLA cases and provide quantitative comparisons (ultimate strength, specific strength, strain, etc.) for evaluating the mechanical integrity and material characteristic flexibility of each case. A Mark-10 ESM1500 single-column force tester was used for all material testing including both tension and compression tests. Two Mark-10 force sensors were used for tension and compression tests; a MR01-500 (500 lbf force limit) for tension and a MR01-2000 (2000 lbf force limit) for compression. Self-tightening wedge grips (Mark-10) were used for all tensile tests while compression plates were used for compression tests. All tests were conducted at a constant displacement rate of 5 mm/s. A Basler acA645-100 gm GigE camera with 659×494 pixel resolution and a frame rate of 10 hertz was used for optical strain measurement. This resolution gave approximately 500 pixels for the testing region of both tensile and compression samples. Additional image settings and external fiber optical lighting intensity (aperture, gain, etc.) were individually selected for each case to provide an optimal image quality depending on environmental lighting and subtle differences in speckle patterns between sample cases.

Figure 10:
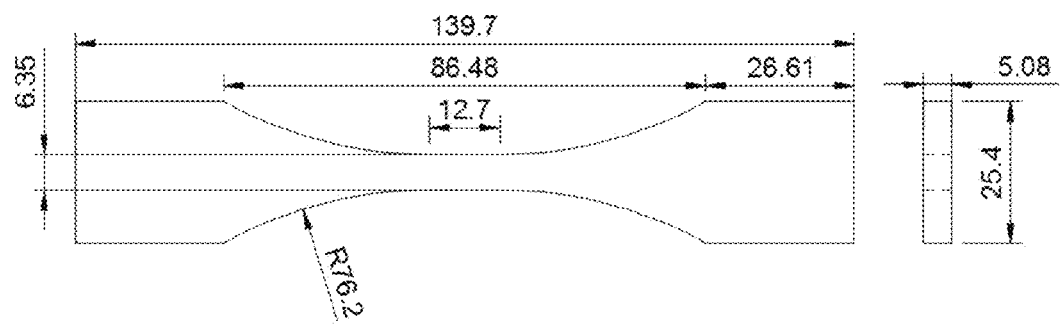
FIG. 10 illustrates the geometry and dimensions for the tensile coupons in millimeters.

Eight samples of each case were tested for both tension and compression. FIG. 10 illustrates the geometry and dimensions for the tensile coupons in millimeters. A 1-inch cube block was used for the compression geometry to provide a flat surface for accurate optical strain measurement. The outer shell of all F3SLA samples were solid infilled (rectilinear FFF) PLA.

Tensile

Figure 11:
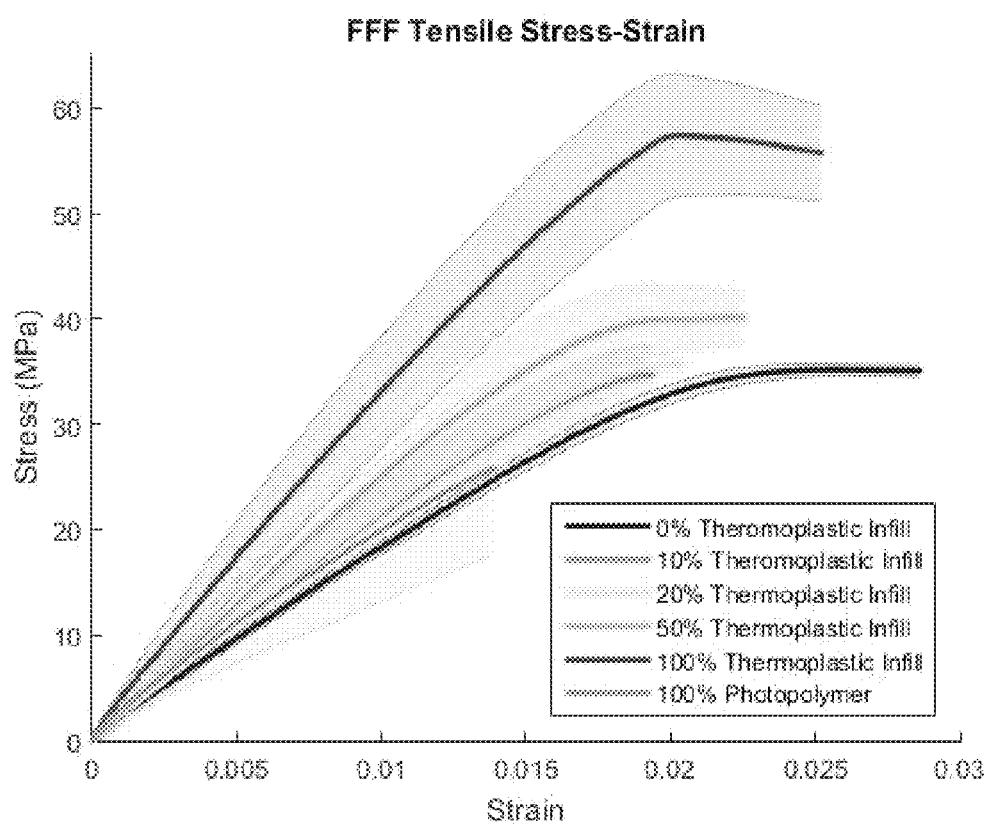
FIG. 11 illustrates the results of the FFF tensile control cases in a median stress-strain plot.

FIG. 11 illustrates the results of the FFF tensile control cases in a median stress-strain plot. The FFF samples of various infill volume percentages all followed a clear trend of increasing both ultimate tensile strength and stiffness with an increase in infill volume percentage. FFF honeycomb infill volume percentages of about 0%, about 10%, and about 20% all exhibited a median ultimate strength within about 3% of each other. An about 50% infill volume percentage coupon resulted in an about 13% increase in strength over an about 20% infill volume percentage coupon, while an about 100% infilled volume percentage coupon resulted in an about 47% increase in ultimate strength over an about 50% infilled volume percentage coupon. 100% photopolymer coupons manufactured by DLP exhibited an about 8% lower ultimate strength than 0% infilled thermoplastic manufactured by FFF and a similar stiffness to an about 10% or 20% infill volume percentage FFF samples.

Figure 12:
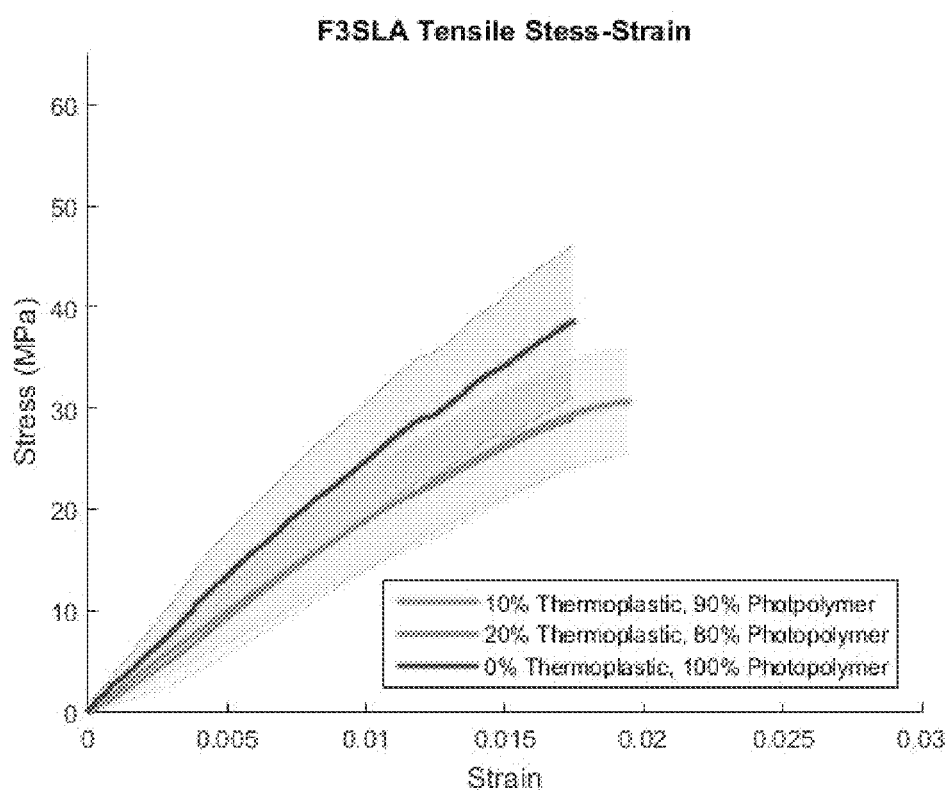
FIG. 12 illustrates a F3SLA stress-strain curve for several samples.

The F3SLA tensile stress-strain curves for photopolymer infilled thermoplastic honeycomb infill coupons are illustrated in FIG. 12. The about 10 vol. % F3SLA sample exhibited an about 2% decrease in ultimate strength and the about 20 vol. % thermoplastic infill F3SLA sample exhibited an about 6% increase in ultimate strength over the DLP control case. The 0 vol. % thermoplastic infill F3SLA sample resulted in an about 45% increase in ultimate strength over the DLP control case. The 0 vol. % thermoplastic infill F3SLA sample resulted in a 34% increase over 0% thermoplastic FFF case but an about 27% decrease versus 100% thermoplastic FFF case.

Compression

Figure 13:
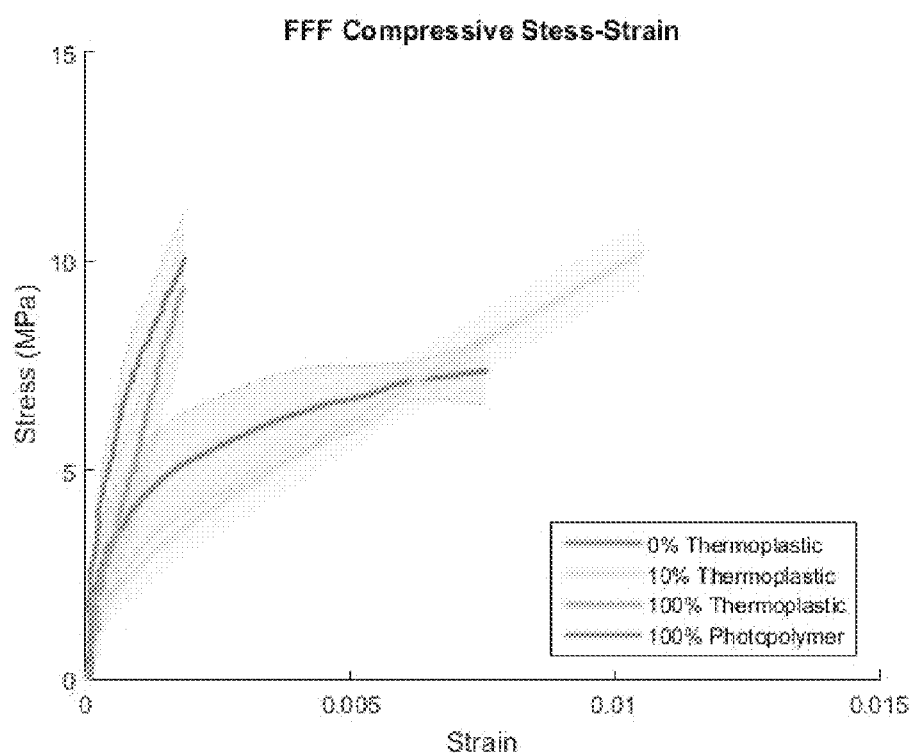
FIG. 13 illustrates compressive stress-strain curves for the FFF and DLP control cases.
Figure 14:
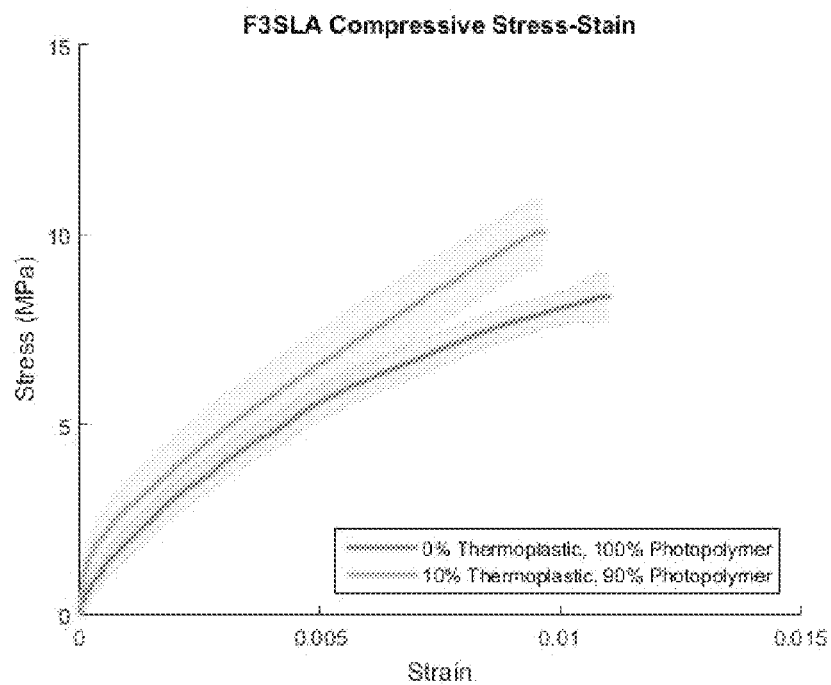
FIG. 14 illustrates the results of the F3SLA samples under compression.

The compressive stress-strain curves for the FFF and DLP control cases are illustrated in FIG. 13. Due to load frame limitations, not all compressive cases were loaded to failure. Failed cases are indicated in Table 3A. All values in the table are approximate. FIG. 14 illustrates the results of the F3SLA samples under compression.

TABLE 3A

| Sample | Load | Failure | Ultimate Stress (MPa) | Ultimate Stress Std Dev | Ultimate Strain (mm/mm) | Strain Std Dev | Effective Specific Strength (kPa/kg/m^3) |
|---|---|---|---|---|---|---|---|
| 0% Thermoplastic Infill (FFF) | T | Yes | 35.18 | 0.434 | 0.0267 | 0.0008 | 61.26 |
| 10% Thermoplastic Infill (FFF) | T | Yes | 35.17 | 0.732 | 0.0215 | 0.0022 | 51.81 |
| 20% Thermoplastic Infill (FFF) | T | Yes | 36.06 | 0.496 | 0.0231 | 0.0011 | 47.30 |
| 50% Thermoplastic Infill (FFF) | T | Yes | 40.67 | 0.485 | 0.0236 | 0.0013 | 41.88 |
| 100% Thermoplastic Infill (FFF) | T | Yes | 60.28 | 1.710 | 0.0236 | 0.0016 | 49.76 |
| 100% Photopolymer (DLP) | T | Yes | 30.80 | 4.899 | 0.0213 | 0.0080 | 23.04 |
| 10% Thermoplastic, 90% Photopolymer (F3SLA) | T | Yes | 31.90 | 1.268 | 0.0235 | 0.0014 | 35.52 |
| 20% Thermoplastic, 80% Photopolymer (F3SLA) | T | Yes | 34.06 | 2.439 | 0.0258 | 0.0021 | 35.07 |
| 0% Thermoplastic, 100% Photopolymer (F3SLA) | T | Yes | 45.18 | 7.364 | 0.0275 | 0.0069 | 44.60 |
| 0% Thermoplastic Infill (FFF) | C | Yes | 7.46 | 0.224 | 0.0061 | 0.0021 | 61.26 |

TABLE 3A-continued

| Sample | Load | Failure | Ultimate Stress (MPa) | Ultimate Stress Std Dev | Ultimate Strain (mm/mm) | Strain Std Dev | Effective Specific Strength (kPa/kg/m^3) |
|---|---|---|---|---|---|---|---|
| 10% Thermoplastic Infill (FFF) | C | No | N/A | N/A | N/A | N/A | N/A |
| 100% Thermoplastic Infill (FFF) | C | No | N/A | N/A | N/A | N/A | N/A |
| 100% Photopolymer (DLP) | C | No | N/A | N/A | N/A | N/A | N/A |
| 0% Thermoplastic, 100% Photopolymer (F3SLA) | C | Yes | 8.55 | 0.61 | 0.0108 | 0.0041 | 8.62 |
| 10% Thermoplastic, 90% Photopolymer (F3SLA) | C | No | N/A | N/A | N/A | N/A | N/A |

Young's modulus was calculated as the tangent modulus for the linear elastic region of each sample case. This was achieved by manually selecting the linear region for each case and averaging the results across all eight samples. Note that the cases largely exhibit nonlinear responses and therefore the Young's modulus is only a valid measurement of material compliance within the linear elastic region. Table 3B illustrates the Young's modulus from the samples in Table 3A. All values in the table are approximate.

TABLE 3B

| Sample | Load | Young (Mpa) |
|---|---|---|
| 0% Thermoplastic Infill (FFF) | T | 1747 |
| 10% Thermoplastic Infill (FFF) | T | 2195 |
| 20% Thermoplastic Infill (FFF) | T | 2193 |
| 50% Thermoplastic Infill (FFF) | T | 2555 |
| 100% Thermoplastic Infill (FFF) | T | 3341 |
| 100% Photopolymer (DLP) | T | 1978 |
| 10% Thermoplastic, 90% Photopolymer (F3SLA) | T | 1952 |
| 20% Thermoplastic, 80% Photopolymer (F3SLA) | T | 1739 |
| 0% Thermoplastic, 100% Photopolymer (F3SLA) | T | 2789 |
| 0% Thermoplastic Infill (FFF) | C | 11972 |
| 10% Thermoplastic Infill (FFF) | C | 6178 |
| 100% Thermoplastic Infill (FFF) | C | 9636 |
| 100% Photopolymer (DLP) | C | 13557 |
| 0% Thermoplastic, 100% Photopolymer (F3SLA) | C | 3028 |
| 10% Thermoplastic, 90% Photopolymer (F3SLA) | C | 8857 |

The about 15% increase in ultimate strength from the about 0% thermoplastic-100% photopolymer sample versus the about 50% infill volume percentage FFF sample suggests that F3SLA has potential to provide high strength parts at lower build durations than high thermoplastic infill volume percentages. While the about 100% infilled thermoplastic sample performs better than all the F3SLA samples in terms of ultimate strength and specific strength, the potential decrease in build time can be attractive for certain applications such as load-bearing prototypes, and end-use components that don't require higher performance. These applications will value quick manufacturing turnaround and high quality surface finish over strength.

From the about 96% increase in ultimate strength and about 116% increase in specific strength, it is clear that the photopolymer used is not as strong of a material as the thermoplastic used under tension. This explains the about 33% increase in ultimate strength between the about 0% Thermoplastic-100% Photopolymer F3SLA case and the about 100% thermoplastic FFF case.

From these comparisons, it is clear that the photopolymer chosen (under the curing parameters as defined by the manufacturer) is a much weaker material that the PLA used when looking at both ultimate strength and specific strength. The DLP case also exhibited a much larger standard deviation in ultimate strength than the samples produced through FFF, which may be caused by the brittleness of photopolymer. Therefore, there is a large chance of defect propagation. Minor defects have a greater chance of leading to ultimate failure of a component made out of photopolymer than more durable thermoplastics.

To evaluate the F3SLA process in direct comparison to both FFF and DLP, the results are set forth in three groups including coupons produced by FFF, DLP, and F3SLA. Each coupon group was evaluated on several metrics including ultimate strength, specific strength, stiffness, and repeatability. Note that these processes are evaluated on a limited number of materials including HATCHBOX PLA (material color silver) and MakerJuice G+(material color red). Table 4 summarizes suggested processes for a desired parameter.

TABLE 4

| Desired Parameter | Process Recommendation |
|---|---|
| Ultimate Strength | FFF, F3SLA |
| Specific Strength | FFF, F3SLA |
| Stiffer | FFF |
| More Compliant | F3SLA, DLP |
| Repeatable | FFF |

R3SLA

The following examples validate RF3SLA as a viable AM method that can produce reliable parts with the flexibility of tunable parameters. Two matrix materials (a photopolymer and an epoxy) are used to demonstrate that both can be successfully used. Eight samples were used for each matrix material case. The first set included only a thermoplastic shell and solid matrix core (no fiber reinforcement). The second set included two layers of evenly dispersed global fibers (140 mm) oriented along the axis of loading The third case used the same total length (1.12 m) of long fibers (8 mm) near-randomly distributed along the axis of loading. The fourth case included the same total length (1.12 mm) of short fibers (2 mm) also distributed near-randomly within the matrix by mixing. Soft Tex 120 Kevlar® fiber were used for reinforcement because of its ease of use, high strength, and good fiber-matrix bonding strength. Table 5 illustrates the parameters for the samples.

TABLE 5

| RF3SLA Sample Parameters | |
|---|---|
| Host Software | Repetier-Host v1.6.0 |
| Slicer Software | Slic3r |
| Printer | MakerGear M2 (24 v) |
| Nozzle Diameter | 0.4 mm |
| Filament Diameter | 1.75 mm |
| Layer Height | 0.3 mm |
| Vertical Shells | 3 |
| Horizontal Shells | 3 Bottom, 0 Top |
| Infill Type | Concentric |
| Top/Bottom Fill Pattern | Rectilinear |
| Extruder Temperature | 230° C. |
| Bed Temperature | 100° C. |
| Standard Print Speed | 80 mm/s |
| Infill Print Speed | N/A |
| Solid Infill Print Speed | 50 mm/s |
| First Layer Print Speed | 40 mm/s |
| Travel Speed | 90 mm/s |

In addition to the eight RF3SLA cases, two control cases were used including a 100% concentrically infilled PLA sample manufactured by FFF and a 100% photopolymer case manufactured by DLP. The ten sample sets are summarized in Table 6.

TABLE 6

| Sample Case | Shell Material | Infill Material | Reinforcement |
|---|---|---|---|
| Non-Reinforced Epoxy | Thermoplastic | Epoxy | |
| Global-Fiber Epoxy | Thermoplastic | Epoxy | Kevlar ® (140 |
| Short-Fiber Epoxy | Thermoplastic | Epoxy | Kevlar ® (2 |
| Long-Fiber Epoxy | Thermoplastic | Epoxy | Kevlar ® (8 |
| Non-Reinforced Photopolymer | Thermoplastic | Photopolymer | |
| Global-Fiber Photopolymer | Thermoplastic | Photopolymer | Kevlar ® (140 |
| Short-Fiber Photopolymer | Thermoplastic | Photopolymer | Kevlar ® (2 |
| Long-Fiber Photopolymer | Thermoplastic | Photopolymer | Kevlar ® (8 |
| 100% Thermoplastic (FFF) | Thermoplastic | Thermoplastic | |
| 100% Photopolymer (DLP) | Photopolymer | Photopolymer | |

Test Samples

All coupons were manufactured in-house with a two-step process. The outer thermoplastic shell was printed, then infilling the shell manually for RF3SLA samples. The shells were left uncapped by thermoplastic allowing the infill to be prepared off the build plate. The thermoplastic shell was prepared layer by layer to closely mimic how the samples are produced in the fully automated RF3SLA system. One liquid infill layer was applied for every two thermoplastic layers to speed the process up although the number of layers is tunable by the operator. The fiber reinforcement was deposited evenly at two different layers before the liquid layer cured to ensure maximum adhesion between the matrix infill and reinforcement. The completed photopolymer samples were put in a UV oven while the epoxy samples were set in a temperature-controlled environment as per the manufacturers' recommendations. MakerJuice Labs G+3D Printing Ink v5 was the photopolymer and Hatchbox Silver PLA 3D Printer Filament was the thermoplastic due to both material's general purpose and widespread availability.

Material Testing

Figure 15A:
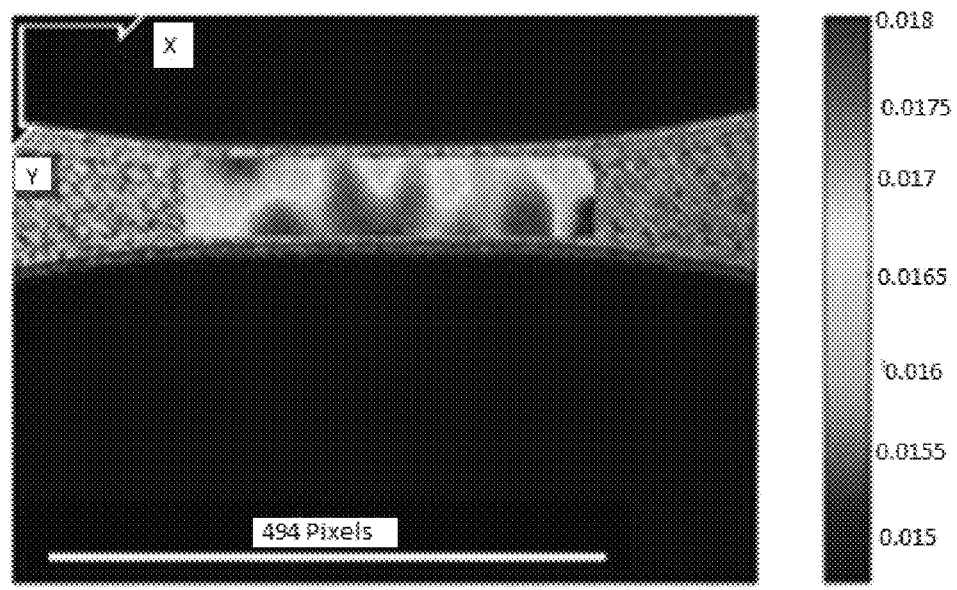
FIG. 15A illustrates a sample 2D DIC strain field of a non-reinforced photopolymer RF3SLA sample.
Figure 15B:
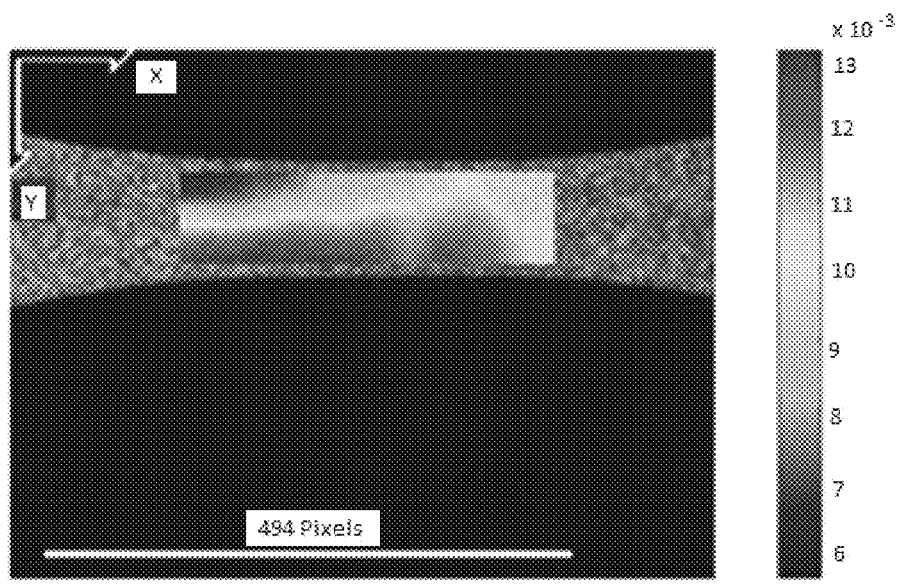
FIG. 15B illustrates a sample 2D DIC strain field of a short-reinforced photopolymer RF3SLA sample.
Figure 15C:
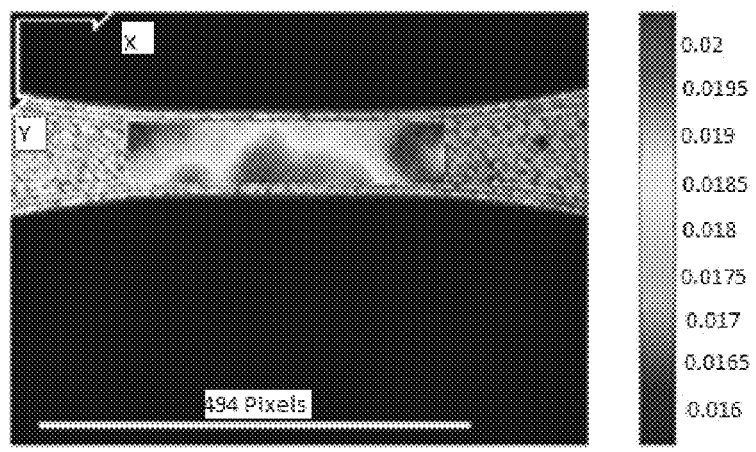
FIG. 15C illustrates a sample 2D DIC strain field of a long-reinforced photopolymer RF3SLA sample.
Figure 15D:
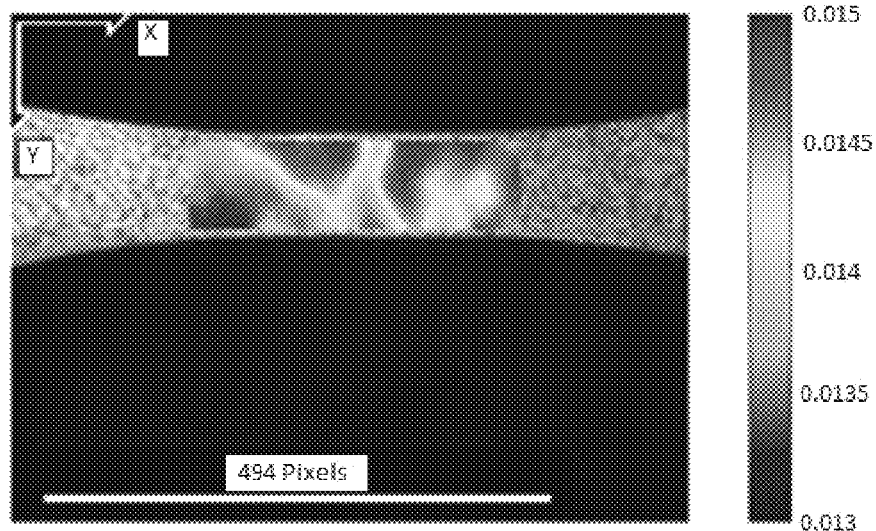
FIG. 15D illustrates a sample 2D DIC strain field of a global-reinforced photopolymer RF3SLA sample.
Figure 15E:
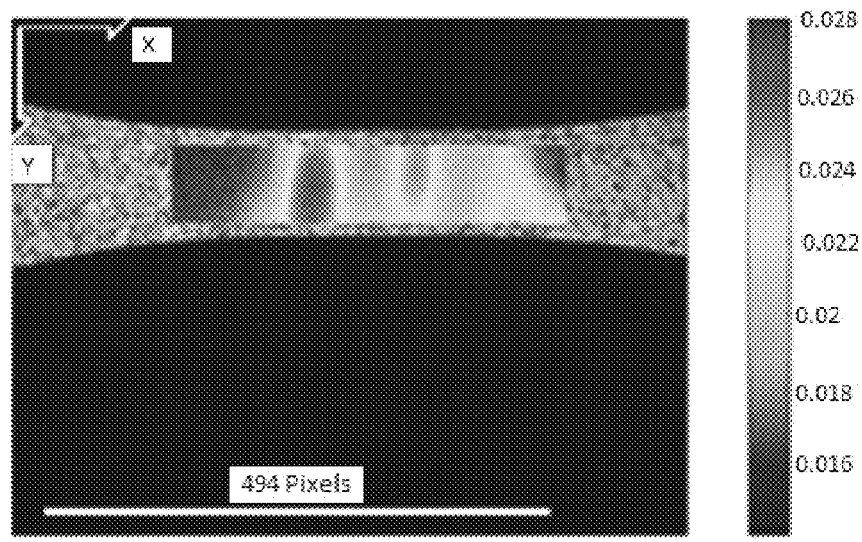
FIG. 15E illustrates a sample 2D DIC strain field of a non-reinforced epoxy RF3SLA sample.
Figure 15F:
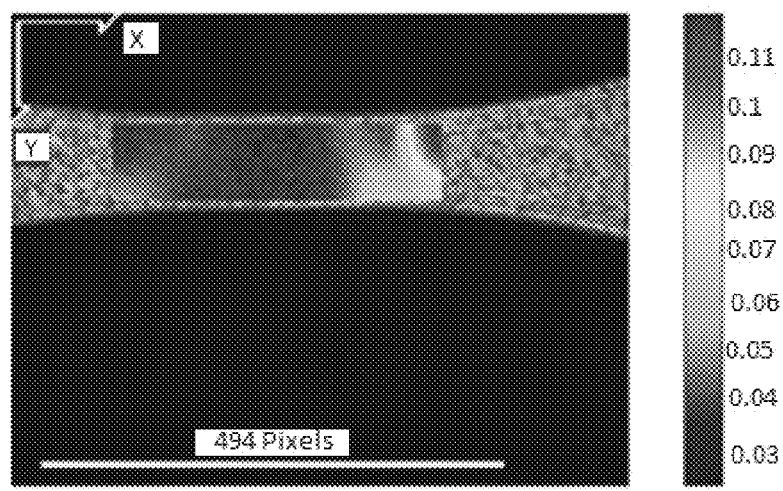
FIG. 15F illustrates a sample 2D DIC strain field of a short-reinforced epoxy RF3SLA sample.
Figure 15G:
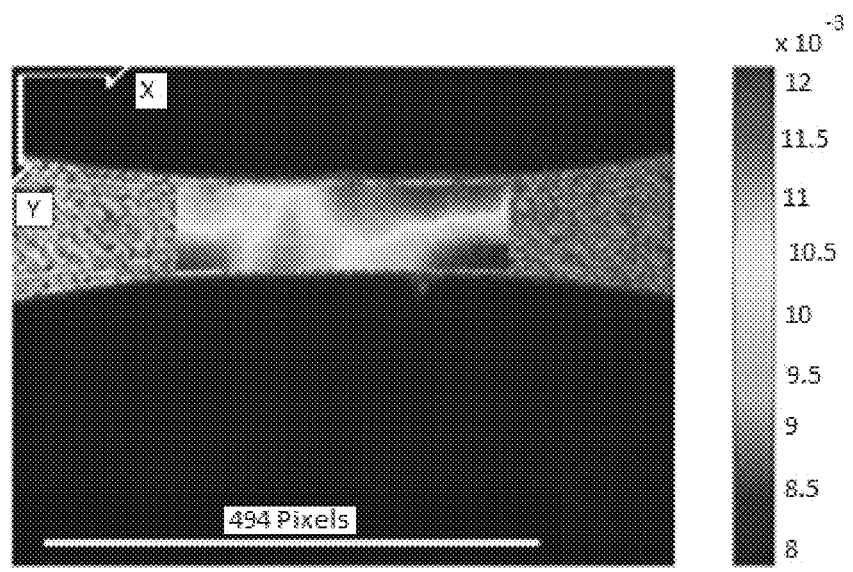
FIG. 15G illustrates a sample 2D DIC strain field of a long-reinforced epoxy RF3SLA sample.
Figure 15H:
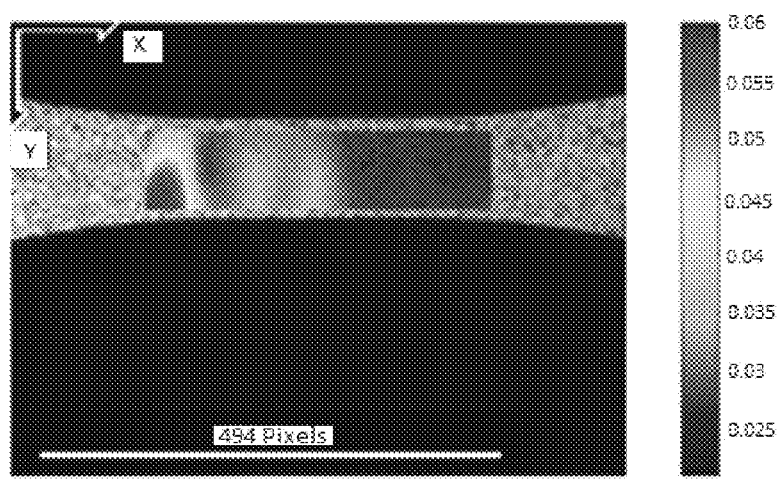
FIG. 15H illustrates a sample 2D DIC strain field of a global-reinforced epoxy RF3SLA sample.

Tensile tests were performed on the ten different sets to demonstrate the mechanical integrity and diverse mechanical property possibilities of RF3SLA parts through the pairing of multiple matrix and phase materials. 2D optical DIC strain measurement techniques were used to obtain an accurate strain measurement showing not only axial strain but also local strain on each coupon. Fiber optic lighting with polarization filters supplied sufficient illumination and minimized glare. FIGS. 15A-15H illustrate a sample 2D DIC strain field overlain for a variety of samples. FIG. 15A illustrates a sample 2D DIC strain field of a non-reinforced photopolymer RF3SLA sample. FIG. 15B illustrates a sample 2D DIC strain field of a short-reinforced photopolymer RF3SLA sample. FIG. 15C illustrates a sample 2D DIC strain field of a long-reinforced photopolymer RF3SLA sample. FIG. 15D illustrates a sample 2D DIC strain field of a global-reinforced photopolymer RF3SLA sample. FIG. 15E illustrates a sample 2D DIC strain field of a non-reinforced epoxy RF3SLA sample. FIG. 15F illustrates a sample 2D DIC strain field of a short-reinforced epoxy RF3SLA sample. FIG. 15G illustrates a sample 2D DIC strain field of a long-reinforced epoxy RF3SLA sample. FIG. 15H illustrates a sample 2D DIC strain field of a global-reinforced epoxy RF3SLA sample.

Uniaxial tension tests were used for measuring material characteristics of both control cases and RF3SLA cases and provide quantitative comparisons (ultimate strength, specific strength, strain, etc.) for evaluating the mechanical integrity and material characteristic flexibility of each case. A Mark-10 ESM1500 single-column force tester was used for all material testing. A Mark-10 MR01-500 (500 lbf force limit) force sensors was used for all tension tests. Self-tightening wedge grips (Mark-10) were used for all tensile tests. All tests were conducted at a constant displacement rate of 5 mm/s. A Basler acA645-100 gm GigE camera with 659×494 pixel resolution and a frame rate of 10 hertz was used for optical strain measurement. This resolution provided an approximately 500 pixels for the testing region of the tensile samples. Additional image settings and external fiber optical lighting intensity (aperture, gain, etc.) were individually selected for each case to provide an optimal image quality depending on environmental lighting and subtle differences in speckle patterns between sample cases. Eight samples of each case were tested for both control and RF3SLA coupons. Unlike the F3SLA samples which contained a top shell, sides and a bottom shell, the RF3SLA samples did not contain a top shell. The outer shell of all RF3SLA samples were solid infilled (rectilinear FFF) PLA.

Tensile

RF3SLA tensile test results are provided in the following three subsections: photopolymer matrix results, epoxy matrix, and a summary comparing photopolymer matrix results versus epoxy matrix results. Median plots were selected versus mean plots for reporting stress-strain curves to minimize the effects of skewness from outliers and therefore better represent the central tendency of the populations for the RF3SLA tensile test results.

Photopolymer RF3SLA

Figure 16:
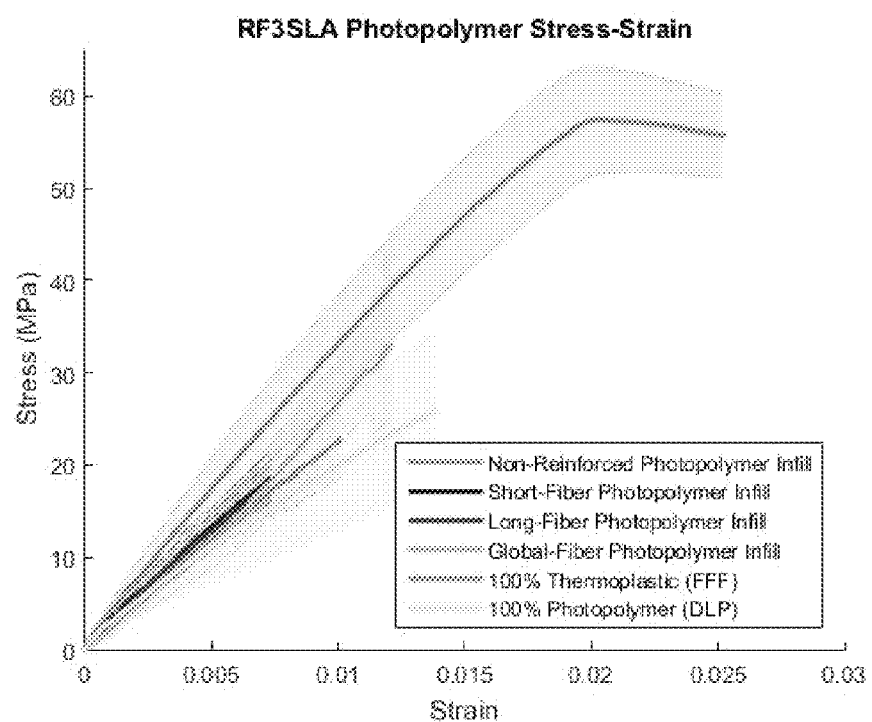
FIG. 16 illustrates RF3SLA stress-strain curves for various photopolymer samples.

The photopolymer RF3SLA tensile tests in a median stress-strain plot are illustrated in FIG. 16. The 100% thermoplastic sample case produced by FFF shows some necking before failure. The remainder of the samples including the 100% photopolymer sample case produced by DLP and the RF3SLA samples show brittle failures with no plastic deformation. While the FFF and DLP samples have smooth stress-strain curves to failure, the RF3SLA samples cases all show minor failures along the path to some degree suggesting phase bonding failures, or micro-cracking before ultimate failure.

None of the photopolymer RF3SLA sample cases matched the 100% infilled thermoplastic FFF case in ultimate strength although there is improvement over the DLP photopolymer case. Both short-fiber reinforcement and long-fiber reinforcement in the photopolymer matrix had negative effects of the ultimate strength of a sample under tension as compared to non-reinforced samples. Global-fiber reinforcement in a photopolymer matrix resulted in an ultimate strength increase of about 45% over non-reinforced RF3SLA photopolymer samples and about 28% over DLP photopolymer samples.

Figure 17:
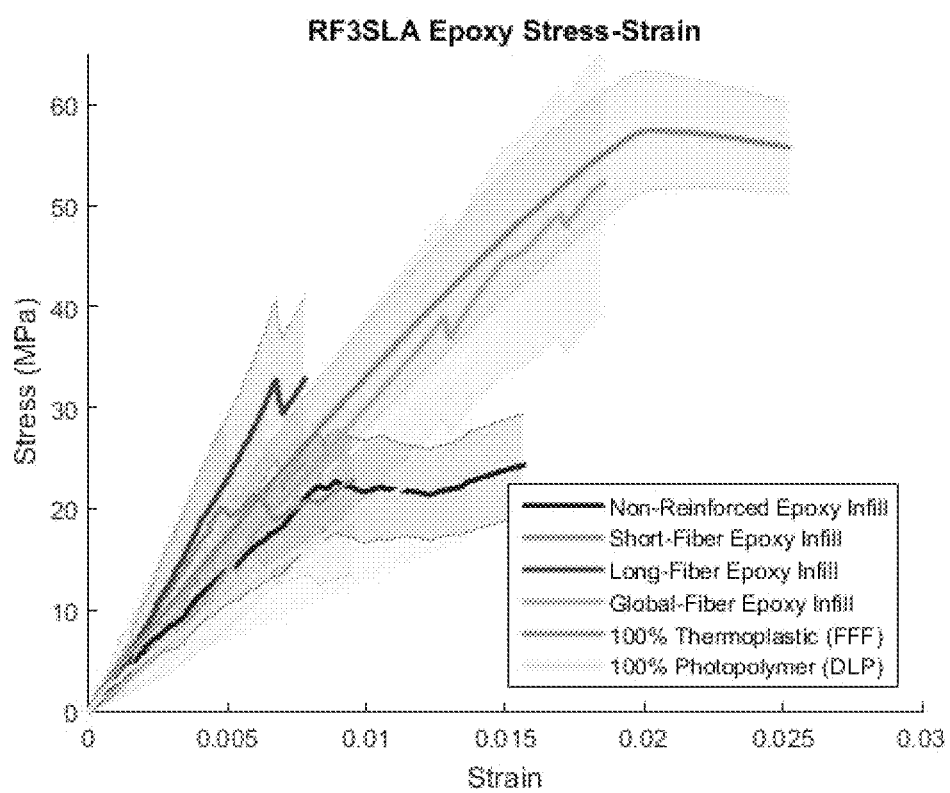
FIG. 17 illustrates RF3SLA stress-strain curves for various epoxy samples.

Epoxy RF3SLA The epoxy RF3SLA tensile test result in a median stress-strain plot illustrated in FIG. 17. The epoxy matrix RF3SLA samples including global-fiber reinforced, long fiber reinforced, and short fiber reinforced all exhibited micro-cracking to a larger degree than their corresponding photopolymer cases. Epoxy matrix samples additionally exhibited larger stress values at micro-cracking than photopolymers. Global fiber reinforced and long fiber reinforced epoxy RF3SLA test samples exhibited brittle failures while non-reinforced and short-fiber reinforced exhibited a plastic deformation region. Globally-reinforced epoxy RF3SLA samples closely followed 100% thermoplastic samples manufactured by FFF in tensile performance. Non-reinforced and short-fiber reinforced epoxy RF3SLA samples failed closer to the DLP case than their corresponding photopolymer cases yet still failed at a lower ultimate stress. The long-fiber reinforced epoxy case performed better than both the long-fiber reinforced photopolymer case and the DLP case.

A summary of ultimate stress, ultimate strain, Young's modulus, specific strength, and standard deviations for all samples as a means for comparison are illustrated in Table 4.2. Table 4.2 was calculated from mean values versus median values presented in FIG. 4.4 and FIG. 4.5, resulting in higher reported values. Standard deviations for both ultimate stress and ultimate strain are reported as sample standard deviations. Young's Modulus was calculated as the tangent modulus for the linear elastic region of each sample case. This was achieved by manually selecting the linear region for each case and averaging the results across all eight samples. Note that the cases largely exhibit nonlinear responses and therefore the Young's modulus is only a valid measurement of material compliance within the linear elastic region.

Short-fiber reinforcement resulted in an about 4% increase in ultimate strength and an about 11% decrease in specific strength for an epoxy matrix. Short-fiber reinforcement resulted in an about 16% decrease in ultimate strength and an about 23% decrease in specific strength for a photopolymer matrix. Both epoxy matrix and photopolymer matrix RF3SLA samples exhibited a stiffer response with short-fiber reinforcement. A larger ultimate stress standard deviation was observed for short-fiber reinforced epoxy samples versus non-reinforced samples while a smaller ultimate stress standard deviation was observed for short-fiber reinforced photopolymers versus non-reinforced photopolymers.

Long-fiber reinforcement in an epoxy matrix resulted in an about 41% increase in ultimate strength and an about 23% increase in specific strength over non-reinforced epoxy. In a photopolymer matrix, long-fiber reinforcement resulted in an about 11% decrease in ultimate strength and an about 14% decrease in specific strength. Long-fiber reinforcement resulted in a stiffer response in both an epoxy matrix and a photopolymer matrix. Similar to the effects of short-fiber reinforcement, long-fiber reinforcement exhibited a larger ultimate stress standard deviation in epoxy and smaller ultimate stress standard deviation in photopolymer with respect to the corresponding non-reinforced cases. In an epoxy matrix, global-fiber reinforcement resulted in an about 102% increase in ultimate strength and an about 98% increase in specific strength. Global-fiber reinforcement resulted in an about 33% increase in ultimate strength and an about 48% increase in specific strength in a photopolymer matrix. Global-fiber reinforcement resulted in a stiffer response under tension as seen by short-fiber reinforcement and long fiber reinforcement.

Additionally, as seen by both short-fiber reinforcement and long-fiber reinforcement, global-fiber reinforcement exhibited a larger ultimate stress standard deviation in an epoxy matrix and a smaller ultimate stress standard deviation in a photopolymer matrix versus the corresponding non-reinforced cases.

The two highest performance materials were 100% thermoplastic and global-reinforced epoxy in terms of both ultimate stress and specific strength. Global-fiber reinforced photopolymer RF3SLA samples exhibited the third highest specific strength. Table 7 provides a summary of the testing results for RF3SLA samples.

TABLE 7

| Sample Case | Ultimate Stress (MPa) | Ultimate Stress Std. Dev. | Ultimate Strain (mm/mm) | Ultimate Strain Std. Dev. | Young's Modulus (MPa) | Specific Strength (kPa/(kg/m$^3$)) |
| --- | --- | --- | --- | --- | --- | --- |
| Non-Reinforced Epoxy | 29.77 | 4.260 | 0.0141 | 0.0047 | 2833 | 25.68 |
| Global-Fiber Epoxy | 60.04 | 9.527 | 0.0187 | 0.0052 | 3039 | 50.88 |
| Short-Fiber Epoxy | 31.01 | 7.190 | 0.0093 | 0.0045 | 4130 | 22.84 |
| Long-Fiber Epoxy | 42.07 | 7.273 | 0.0107 | 0.0029 | 3799 | 31.48 |
| Non-Reinforced Photopolymer | 30.59 | 9.880 | 0.0141 | 0.0044 | 2362 | 29.59 |
| Global-Fiber Photopolymer | 40.56 | 8.637 | 0.0151 | 0.0034 | 2338 | 43.64 |
| Short-Fiber Photopolymer | 25.81 | 4.237 | 0.0113 | 0.0025 | 2581 | 22.89 |
| Long-Fiber Photopolymer | 27.24 | 6.107 | 0.0110 | 0.0033 | 2921 | 25.57 |
| 100% Thermoplastic (FFF) | 60.28 | 1.710 | 0.0236 | 0.0016 | 3341 | 49.76 |
| 100% Photopolymer (DLP) | 30.80 | 4.899 | 0.0213 | 0.0080 | 1978 | 23.04 |

Photopolymer matrices for non-reinforced, short-fiber reinforced, long-fiber reinforced, and global-fiber reinforced cases all exhibit a linear stress-strain response with minute micro-cracking and brittle failures. Epoxy matrices also exhibit linear stress-strain responses and a brittle failure for long-fiber reinforcement and global-fiber reinforcement although epoxy matrices perform differently for the non-reinforced and short-fiber reinforcement cases. Non-reinforced and short-fiber reinforced epoxies result in a linear elastic region followed by some degree of plastic deformation before failure. The larger stress values at micro-cracking for epoxy samples indicate that the epoxy used has a greater toughness than the photopolymer.

Global-fiber reinforcement results in a decisive benefit for both epoxy and photopolymer matrices. In an epoxy matrix, global-fiber reinforcement exhibits an about 98% increase in specific strength. In a photopolymer matrix, global fiber reinforcement exhibits an about 48% increase in specific strength. Globally-reinforced epoxy and photopolymer matrix coupons experience different failure modes. Global reinforced epoxy matrix cores typically experience delamination and a shattering of matrix material at the center of the testing region. Global reinforced photopolymer matrix consistently failed at the outer regions of the reduced testing section. Photopolymer matrix failures often appear to stem from cracks formed from the self-tightening wedge grips of the load frame under large tension loads. Similar to the long-fiber reinforcement case, there was less fiber protruding from the epoxy matrix than the photopolymer matrix indicating a better shear load transfer in the epoxy case. There is also an increase in global-reinforced epoxy ultimate strain versus global-reinforced photopolymers indicating that the epoxy used bonded better to the Kevlar® fiber.

To provide insight into effective use of RF3SLA, results of the RF3SLA material testing sets are set forth in different cases including epoxy matrix, photopolymer matrix, no-fiber reinforcement, short-fiber reinforcement, long-fiber reinforcement, and global-fiber reinforcement. Evaluating these sets on certain metrics such as ultimate strength, specific strength, stiffness, and repeatability, above average performance for each matrix and phase material could be identified. The results are presented in Table 8. It should be noted that only one epoxy and photopolymer were tested in this set and therefore these general recommendations may not be valid for every material in each case. Additional material testing and cataloging would allow for a larger database to be constructed for effective use of RF3SLA.

TABLE 8

| Desired Parameters | RF3SLA Recommendations |
| --- | --- |
| Ultimate Strength | Epoxy Matrix, Long-Fiber Reinforcement |
| Specific Strength | Global-Fiber Reinforcement |
| Stiffer | Epoxy Matrix, Long-Fiber Reinforcement |
| More Compliant | Photopolymer Matrix, No Fiber |
| Reinforces Repeatable Reinforcement | Short Fiber |

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method to produce a thermoplastic and filled material part, comprising:
producing a shell, wherein the shell comprises at least one layer of a thermoplastic material and wherein the shell is produced by fused filament fabrication;
providing at least one layer of a filler material to the shell, wherein the filler material is a photo-curing resin, an epoxy and combinations thereof, and wherein the filler material is provided to the shell manually by a user; and
curing the filler material to produce a thermoplastic and filled material part.

2. The method of claim 1, wherein the at least one layer of the filler material comprises between about 1 and about 100,000 layers.

3. The method of claim 1, further comprising producing an infill structure, wherein the infill structure is produced by fused filament fabrication.

4. The method of claim 1, further comprising providing at least one reinforcing material to the at least one layer of the filler material before the at least one layer of the filler material is cured.

5. The method of claim 4, wherein the at least one reinforcing material is a carbon particle, a fiberglass, a metal fiber, a metal particle, a poly(imino-1,4-phenyleneiminocarbonyl-1,4-phenylenecarbonyl), a carbon fiber, a pliable fiber, a nylon material, and a polymer material.

6. The method of claim 4, wherein the at least one reinforcing material is orientated in the same direction.

7. The method of claim 4, wherein the at least one reinforcing material is a global fiber, a short fiber or a long fiber.

8. The method of claim 4, wherein the at least one reinforcing material is randomly oriented.

9. The method of claim 1, wherein the thermoplastic material is selected from the group consisting of a polylactic acid, an acrylonitrile butadiene styrene, a high impact polystyrene, a nylon material, and combinations thereof.

10. The method of claim 1, wherein the filler material is the photo-curing resin and wherein the photo-curing resin comprises an acrylate ester.

11. The method of claim 1, wherein the filler material is the epoxy, and wherein the epoxy is a quick cure epoxy, a two-part epoxy or combinations thereof.

12. The method of claim 1, wherein the fused filament fabrication is automated.

13. The method of claim 1, wherein the filler material is the photo-curing resin, and wherein the curing step comprises exposing the filler material to a light source.

14. The method of claim 13, wherein the light source is an ultraviolet light.

15. The method of claim 1, further comprising:
treating at least one surface of the shell prior to providing the at least one layer of the filler material to the shell by a method selected from the group consisting of a chemically etching process, or a roughening of a surface of the shell; and
cleaning the at least one surface with a polar solvent, a non-polar solvent, or a combination thereof.

16. The method of claim 13, wherein the light source is a laser or a flood light.

17. The method of claim 1, wherein a layer of the at least one layers of the filler material is provided to the shell and cured before a second layer of the at least one layers is provided to the shell.

18. The method of claim 1, further comprising removing air bubbles in the filler material prior to the curing.

19. The method of claim 3, wherein the thermoplastic and filled material part comprises between 10 vol. % and 50 vol. % of the infill.

20. The method of claim 1, wherein the filler further comprises a dopant material comprising at least one of a metal, an iron, a silver, a copper, a ceramic, an alumina, an organic material, a carbon material, a carbon containing material, a graphene, and a carbon black material.

* * * * *